US012581414B2

(12) United States Patent
Do et al.

(10) Patent No.: US 12,581,414 B2
(45) Date of Patent: Mar. 17, 2026

(54) WAKE-UP SIGNAL AND GO-TO-SLEEP SIGNAL FOR SIDELINK COMMUNICATIONS

(71) Applicant: Telefonaktiebolaget LM Ericsson (publ), Stockholm (SE)

(72) Inventors: Hieu Do, Järfälla (SE); Shehzad Ali Ashraf, Aachen (DE); Ricardo Blasco Serrano, Espoo (FI); Jose Angel Leon Calvo, Aachen (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 398 days.

(21) Appl. No.: 18/249,770

(22) PCT Filed: Oct. 22, 2021

(86) PCT No.: PCT/SE2021/051064
§ 371 (c)(1),
(2) Date: Apr. 20, 2023

(87) PCT Pub. No.: WO2022/086427
PCT Pub. Date: Apr. 28, 2022

(65) Prior Publication Data
US 2024/0015656 A1     Jan. 11, 2024

Related U.S. Application Data

(60) Provisional application No. 63/104,328, filed on Oct. 22, 2020.

(51) Int. Cl.
H04W 52/02     (2009.01)
H04W 76/28     (2018.01)

(52) U.S. Cl.
CPC ....... H04W 52/0235 (2013.01); H04W 76/28 (2018.02)

(58) Field of Classification Search
CPC ............. H04W 52/0235; H04W 76/28; H04W 52/0229; H04W 76/14; Y02D 30/70
See application file for complete search history.

(56) References Cited

U.S. PATENT DOCUMENTS

2016/0142974 A1     5/2016   Lindoff et al.
2017/0245319 A1     8/2017   Yasukawa et al.
(Continued)

FOREIGN PATENT DOCUMENTS

CN     110574443 A     12/2019
CN     111567070 A     8/2020
(Continued)

OTHER PUBLICATIONS

3GPP TSG RAN WG1 Meeting #102-E; R1-2005896; Source: Intel Corporation; Title: Sidelink enhancements for UE power saving; e-Meeting, Aug. 17-28, 2020. (Year: 2020).*
(Continued)

*Primary Examiner* — Mohammed S Chowdhury
(74) *Attorney, Agent, or Firm* — Weisberg I.P. Law, P.A.

(57)     ABSTRACT

A method, system and apparatus are disclosed for wake-up signal and go-to-sleep signal for sidelink communications. In one embodiment, a wireless device is configured to monitor a power saving signal for the SL DRX on at least one resource within a set of dedicated resources at a physical sidelink feedback channel, PSFCH, occasion. In one embodiment, a wireless device is configured to transmit, to a further WD, a power saving signal for the SL DRX on at least one resource within a set of dedicated resources at a physical sidelink feedback channel, PSFCH, occasion.

8 Claims, 13 Drawing Sheets

(56) References Cited

U.S. PATENT DOCUMENTS

| | | | | |
|---|---|---|---|---|
| 2020/0053647 | A1 | 2/2020 | Chae et al. | |
| 2023/0072047 | A1* | 3/2023 | Beale | H04W 52/0229 |
| 2023/0189388 | A1* | 6/2023 | Yu | H04W 76/40 |
| | | | | 370/329 |
| 2023/0224813 | A1* | 7/2023 | Mohammad Soleymani | |
| | | | | H04W 52/0216 |
| | | | | 370/311 |
| 2023/0239837 | A1* | 7/2023 | Ye | H04W 72/02 |
| | | | | 370/329 |

FOREIGN PATENT DOCUMENTS

| | | |
|---|---|---|
| WO | 2016089294 A1 | 6/2016 |
| WO | 2021034940 A1 | 2/2021 |

OTHER PUBLICATIONS

3GPP TSG RAN WG1 #102-e; R1-2006172; Source: Samsung; Title: On Sidelink Issues and RAN1 Impacts; e-Meeting, Aug. 17-28, 2020 (Year: 2020).*

International Search Report and Written Opinion dated Dec. 20, 2021 for International Application No. PCT/SE2021/051064 filed Oct. 22, 2021, consisting of 13-pages.

3GPP TS 38.212 V16.3.0; 3rd Generation Partnership Project; Technical Specification Group Radio Access Network; NR; Multiplexing and channel coding (Release 16); Sep. 2020, consisting of 152-pages.

3GPP TS 38.213 V16.3.0; 3rd Generation Partnership Project; Technical Specification Group Radio Access Network; NR; Physical layer procedures for control (Release 16); Sep. 2020, consisting of 179-pages.

3GPP TSG RAN Meeting #86 RP-193231 (revision of RP-193134); Title: New WID on NR sidelink enhancement; Agenda Item: 9.1.1; Source: LG Electronics; Document for: Approval; Date and Location: Dec. 9-12, 2019, Sitges, Spain, consisting of 6-pages.

3GPP TSG-RAN WG2 Meeting #97bis R2-1703593; Title: Discussion on paging relay and sidelink maintenance; Agenda Item: 9.1.2.2; Source: Sequans Communications; Document for: Discussion and decision; Date and Location: Apr. 3-7, 2017, Spokane, USA, consisting of 8-pages.

3GPP TSG RAN WG1 #106bis-e R1-2109061; Title: Wake up signal for NR sidelink; Agenda Item: 8.11.2; Source: OPPO; Document for: Discussion and Decision; Date and Location: Oct. 11-19, 2021, e-Meeting, consisting of 2-pages.

* cited by examiner

BEGIN

TRANSMIT ONE OF A WAKE-UP-SIGNAL (WUS) AND A GO-TO-SLEEP SIGNAL (GTS) FOR SIDELINK (SL) ON AT LEAST ONE RESOURCE WITHIN A SET OF DEDICATED RESOURCES DURING A PHYSICAL SIDELINK FEEDBACK CHANNEL (PSFCH) OCCASION
S136

END

WAKE-UP SIGNAL AND GO-TO-SLEEP SIGNAL FOR SIDELINK COMMUNICATIONS

CROSS-REFERENCE TO RELATED APPLICATIONS

This application is a Submission Under 35 U.S.C. § 371 for U.S. National Stage Patent Application of International Application No.: PCT/SE2021/051064, filed Oct. 22, 2021 entitled "WAKE-UP SIGNAL AND GO-TO-SLEEP SIGNAL FOR SIDELINK COMMUNICATIONS," which claims priority to U.S. Provisional Application No. 63/104, 328, filed Oct. 22, 2020, entitled "WAKE-UP SIGNAL AND GO-TO-SLEEP SIGNAL FOR SIDELINK COMMUNICATIONS," the entireties of both of which are incorporated herein by reference.

FIELD

The present disclosure relates to wireless communications, and in particular, to wake-up signals and go-to-sleep signals for sidelink communications.

BACKGROUND

Energy/Power Saving Mechanisms in Wireless Communications

For many use cases in wireless communications it rarely happens that a wireless device (WD, often referred to as a user equipment or a UE) receives useful data continuously over time. Since the energy source of the WD is often limited (e.g., due to the battery capacity), it is desirable to have some mechanism to power down at least some of the circuits in the WD when the WD is not expected to receive useful data. There are several of such energy-saving or power-saving mechanisms developed by the 3$^{rd}$ Generation Partnership Project (3GPP), as summarized below.

Discontinuous Reception (DRX)

In 3GPP Long Term Evolution (LTE) or 3GPP 5$^{th}$ Generation (5G, also called New Radio or NR), the DRX functionality controls the expected WD behavior in terms of reception and processing of transmissions. Broadly speaking, the DRX functionality defines the notion of Active Time (also referred to as Active Time state or ACTIVE state or DRX ON state), in which the WD is expected to receive and process incoming transmissions as appropriate. For example, the WD is expected to decode the downlink (DL) control channels, and process grants, etc. Conversely, when the WD is not in Active Time, there is no expectation on the WD receiving and processing transmissions (also referred to as INACTIVE state or IDLE state or DRX OFF state). That is, the network node (NN), such as base station (BS) cannot assume that the WD will be listening to downlink (DL) transmissions. The DRX configuration defines the transitions between these two states (i.e., ACTIVE and INACTIVE).

Typically, WDs that are not in Active Time turn off some of their components and enter a low-power (i.e., sleeping) mode. To ensure that the WD switches regularly to Active Time (i.e., wakes up), a DRX cycle is defined. This DRX cycle is controlled by two parameters:

The periodicity of the DRX cycle, which controls how frequently the WD switches to Active Time.

The duration of the Active Time, which controls for how long the WD is in active state.

In addition to this basic cycle, the DRX procedures also define other conditions/timers that may allow the WD to switch between Active Time and Inactive Time. For example, if a WD is expecting a retransmission from the gNB, the WD may enter Inactive Time (i.e., while the gNB prepares the retransmission) and then may enter Active Time (i.e., during a window in which the gNB may send the retransmission). Some of the timers in the DRX procedure are defined for each hybrid automatic repeat request (HARQ) process. To determine whether it is in Active Time or not, the WD will consider the timers for all HARQ processes.

Note that the Active Time due to the DRX cycle is determined by the DRX configuration. In other words, it may be considered easy to predict when the WD will be in Active Time for the DRX cycle (unless the WD is explicitly commanded to leave Active Time).

Wake-Up Signal and Wake-Up Channel

Another mechanism developed in 3GPP for energy/power saving and related to DRX is the wake-up signal (WUS) or wake-up channel (WUC). In this framework, a WD is configured to detect or decode a WUS or a WUC at a certain time gap before the next occasion wherein the WD is supposed to be Active to monitor a control channel (typically the Physical Downlink Control Channel—PDCCH). If the WUS/WUC is found, the WD wakes up as usual, otherwise the WD can continue to be in sleep mode. This helps further reduce WD energy consumption besides the DRX.

WUS was first developed for the LTE-M (LTE Machine Type Communication) and Narrowband-Internet-of-Things (NB-IoT) in LTE Release 15 (Rel-15). These are the use cases where power saving is paramount due to the limited capability of the devices. As illustrated in FIG. 1, the WUS can be decoded or detected before the WD decodes paging on the physical downlink control channel (PDCCH) and physical downlink shared channel (PDSCH). Without WUS, the WD would have to monitor the PDCCH for paging at each paging occasion (PO). With the WUS approach, the WD only needs to decode the PDCCH when WUS is detected, otherwise, the WD will stay in sleep mode.

FIG. 1 illustrates an example of DRX without a WUS (upper) and DRX with a WUS (lower) for NB-IoT. In ACTIVE state, the WD monitors the downlink control channel PDCCH in paging occasions (PO), whereas in the INACTIVE state the WD is in Sleep mode. The WUS is designed to appear at a time gap before the next PO.

In LTE 3GPP Release 16 (Rel-16) the WUS framework was extended to cover the WUS for a group of devices. In parallel, NR 3GPP Rel-16 specifies a WUC, which is in the form of a downlink control information (DCI format 2-6) carried by the Physical Downlink Control Channel (PDCCH). However, in contrast to LTE WUS, the WUC in NR Rel-16 is targeting RRC connected mode of the WD and the search space for WUC (which is in the form of DCI format 2-6 as specified in 3GPP Technical Specification (TS) 38.212) is configured before the DRX Active time. The remaining WD behavior after receiving the WUC is quite similar to WUS in LTE i.e., the WD can decide to remain in INACTIVE state if it does not receive the WUC.

Go-to-Sleep Signal (GTS)

In contrast to the WUS/WUC which enables a WD to opportunistically skip a DRX ON duration if there is no data being sent to the WD during that duration, a GTS is a signal that tells a WD in the active mode to switch to sleep mode early if no more data is going to be sent to the WD. GTS was studied by 3GPP in Rel-16 to allow a WD to skip PDCCH monitoring during its active time if there is no more data to schedule. However, GTS has not been supported by 3GPP yet.

Sidelink Communications

3GPP has specified the LTE D2D (device-to-device) technology, also known as sidelink (SL) or the PC5 interface, as part of Release 12 (Rel-12). The target use case (UC) is the Proximity Services (communication and discovery). Support was enhanced during 3GPP Release 13 (Rel-13). In 3GPP Release 14 (Rel-14), the LTE sidelink was extensively redesigned to support vehicular communications (commonly referred to as V2X or V2V) and some enhancements were specified during 3GPP Release 15 (Rel-15) only targeting V2X use cases. From the point of view of the lowest radio layers (PHY layer), the LTE SL uses broadcast communication i.e., no HARQ feedback and channel based adaptations are possible. That is, transmission from a transmitting WD targets any receiver WD in its proximity.

In Rel-16, 3GPP introduced the sidelink for the 5G new radio (NR). The driving UCs were vehicular communications with more stringent requirements than those typically served using the LTE SL. To meet these requirements, the NR SL is capable of broadcast, groupcast, and unicast communications at lower radio layers (i.e. PHY layer). In groupcast communication, the intended receivers of a message are typically a subset of the vehicles near the transmitter, whereas in unicast communication, there is a single intended receiver.

Both the LTE SL and the NR SL can operate with and without network coverage and with varying degrees of interaction between the WDs and the NW (network, or network node), including support for network-less operation.

In the upcoming 3GPP Release 17 (Rel-17), 3GPP is working on enhancements for the NR SL, not only to improve the capabilities of NR SL for V2X but also to address other UCs such as National Security and Public Safety (NSPS) as well as commercial UCs such as Network Controlled Interactive Services (NCIS). In the future, the NR SL may be enhanced further to address other UCs such as industrial IoT requiring ultra-reliable and low-latency communication (URLLC).

HARQ Feedback in NR Sidelink

For NR SL unicast and groupcast, the Hybrid Automatic Repeat reQuest (HARQ) can be used to improve the reliability of communication. Typically, in HARQ, the receiver WD (Rx WD) of a data packet sends back to the transmitter WD (Tx WD) a positive acknowledgement (ACK) if the Rx WD has decoded the packet correctly. Otherwise, the Rx WD sends a negative acknowledgement (NACK), which acts as a request for the Tx WD to resend the packet. As a result, the Tx WD will transmit a new packet in case of receiving an ACK and retransmit either the same version or a different version of the initial packet in case of receiving a NACK. Sometimes only ACKs or only NACKs are allowed in the system.

For NR SL unicast, both acknowledgement (ACK) and non-acknowledgement (NACK) feedback are supported. For groupcast, however, there are two options: Groupcast Option 1 supports only NACK feedback while groupcast Option 2 supports both ACK and NACK as in unicast.

NR SL specifies a physical channel, termed Physical Sidelink Feedback Channel (PSFCH), to convey one bit HARQ feedback (i.e., either an ACK or a NACK indication) for an associated Physical Sidelink Shared Channel (PSSCH, which carries the data payload). A PSFCH is constructed based on a phase rotation (equivalently, a cyclic shift (CS) in the time domain) of a base sequence and is transmitted in one resource block (RB). The base sequence is (pre-)configured per SL resource pool. A combination of a resource block and a CS pair (there can be multiple CS pairs for one resource block) is often referred to as a PSFCH resource. Finally, the information bit (i.e., ACK or NACK) determines one CS in a CS pair. In time domain, the PSFCH includes two identical consecutive orthogonal frequency division multiplexing (OFDM) symbols, which are typically located near the end of an NR SL slot.

PSFCH Resources in 3GPP Rel-16 are Specified Using the Following Examples:

In the time direction, not every NR SL slot contains resources for PSFCH. Specifically, the slots in which the PSFCH can be transmitted, also called PSFCH occasions or PSFCH slots, are configured to be every slot or every 2 slots or every 4 slots of the SL resource pool. Hereafter we call the interval (in terms of the number of SL slots) between two consecutive PSFCH occasions the PSFCH-periodicity. In other words, the PSFCH-periodicity can be 1, 2, or 4. In some cases, no PSFCH is allowed in a resource pool. In the frequency direction, (pre-)configuration can control the number of resource blocks in a PSFCH occasion to be used for PSFCH transmissions (i.e., there can be resource blocks in a PSFCH occasion which are configured not to be used for PSFCH transmissions by Rel-16 WDs).

The HARQ feedback corresponding for a PSSCH is transmitted on a PSFCH at the first PSFCH occasion after a configured number of SL slots from the PSSCH reception. This configured number can be 2 or 3 slots, depending on the specific configuration. This number may be referred to as the PSFCH-min-time-gap.

A PSFCH slot contains HARQ feedbacks for at most PSFCH-periodicity associated PSSCH slots. The PSFCH resource in which the HARQ feedback corresponding to a PSSCH is determined based on the following factors:

The Layer-1 identification (ID) (i.e., physical-layer ID) of the Tx WD (i.e., the WD transmitted the PSSCH).

In case of groupcast Option 2, the member ID of the Rx WD (i.e., the WD received the PSSCH and is transmitting the HARQ feedback) in the group. For unicast and groupcast Option 1 this value is set to 0.

The subchannel index and the slot index of the PSSCH.

In NR SL there are Two Groupcast Options:

Option 1: WDs in a group do not have member ID and each Rx WD only sends NACK acknowledgement to the Tx WD (i.e., Rx WD does not send ACK). This option does NOT require group establishment.

Option 2: each WD in the group has a member ID and each Rx UE sends ACK or NACK acknowledgement to the Tx WD. This option requires a group establishment phase.

For PSFCH: the PSFCH resources in Option 2 is based on several factors, including a member ID, while for Option 1 the value corresponding to member ID is set to 0.

FIG. 2 illustrates an example segment of a SL resource pool with PSFCH occasions for the case PSFCH-periodicity=4 and PSFCH-min-time-gap=2. FIG. 2 illustrates an example of a segment of a sidelink resource pool with two subchannels. The shaded bands at the end of some slots indicate PSFCH occasions. PSFCH-periodicity=4 and PSFCH-min-time-gap=2. The dotted arrow indicates that, due to the constraint set by PSFCH-min-time-gap, only the PSSCHs transmitted in slots before slot n+1 can be acknowledged with HARQ feedback transmitted in the PSFCH occasion in slot n+2. Note there are cases where the interval between two consecutive PSFCH occasions is less than PSFCH-periodicity.

Energy/Power Saving in 3GPP Sidelink

In V2X, WDs are typically mounted in a car and have no significant power restrictions. In contrast, National Security and Public Safety (NSPS) or Network Controlled Interactive Service (NCIS) mostly use handheld WDs, for which energy efficiency is a concern. With this in mind, the Rel-17 Work Item (WI) on NR sidelink enhancements (RP-193231) includes the study and specification of SL DRX mechanism as one of its objectives. This includes defining SL DRX configurations and the corresponding WD procedure, specifying mechanisms to align sidelink DRX configurations among the WDs communicating with each other, and specifying mechanisms to align sidelink DRX configurations with Uu DRX configurations for an in-coverage WD.

As with DRX in the Uu, it is most likely that SL DRX also includes a set of timers that define the Active Time and a set of timers that define the Inactive Time.

Sidelink Resource Pool and Resource Pool Bitmap

The NR sidelink uses the notion of a resource pool, which is a set of time-frequency resources that can be used for sidelink communication. For example, in a certain carrier only part of the frequencies may be used for sidelink communication. Similarly, the resource pool may limit the time resources that can be used for sidelink communication (e.g., only even-numbered or odd-numbered slots).

A resource pool may be identified by a set of RBs (i.e., frequencies), usually in terms of a range of RBs and a bitmap. The bitmap identifies which of the time resources (e.g., symbols, slots, frames, subframes, etc.) are usable for sidelink communication. In some cases (e.g., for a dedicated sidelink carrier), the bitmap may indicate that all the resources are available for sidelink communication. In other cases, some of the resources may not be available for sidelink communication (e.g., used for uplink/downlink communication, available for other sidelink transmissions/communications).

Note that a WD may be configured with multiple resources pools. For example, a WD may be configured with two pools; traffic belonging to type 1 is to be transmitted in pool 1 whereas traffic belonging to type 2 is to be transmitted in pool 2.

SUMMARY

Some embodiments advantageously provide methods, systems, and apparatuses for wake-up signal and go-to-sleep signal for sidelink communications enable WUS and GTS in the SL to optimize WD energy consumption on top of DRX without requiring a completely new physical signal/channel nor extra dedicated resources incompatible with the existing SL resource structure.

In one embodiment, a wireless device is configured to receive one of a wake-up-signal (WUS) and a go-to-sleep signal (GTS) for sidelink (SL) on at least one resource within a set of dedicated resources during a physical sidelink feedback channel (PSFCH) occasion.

In one embodiment, a wireless device is configured to transmit one of a wake-up-signal (WUS) and a go-to-sleep signal (GTS) for sidelink (SL) on at least one resource within a set of dedicated resources during a physical sidelink feedback channel (PSFCH) occasion.

According to one aspect, a method implemented in a wireless device, WD, operating in a sidelink, SL, discontinuous reception, DRX is provided. The method comprises monitoring a power saving signal for the SL DRX on at least one resource within a set of dedicated resources at a physical sidelink feedback channel, PSFCH, occasion.

In some embodiments, the power saving signal is at least one of a wake-up-signal, WUS, and a go-to-sleep signal, GTS; and the method further comprises as a result of detecting the at least one of the WUS and the GTS, switching between a DRX Inactive state and a DRX Active state. In some embodiments, the power saving signal is the WUS; and the method further comprises as a result of detecting the WUS at the PSFCH occasion, switching the WD from the DRX Inactive state to the DRX Active state. In some embodiments, the PSFCH occasion is at a first PSFCH occasion occurring before a time period, T, before a start of a discontinuous reception, DRX, ON duration of a DRX cycle.

In some embodiments, the WD is predefined to monitor the WUS at the first PSFCH occasion occurring at or before the time period, T, before the start of the DRX ON duration. In some embodiments, the method further comprises receiving, from a network node, a configuration to monitor the WUS at the first PSFCH occasion occurring at or before the time period, T, before the start of the DRX ON duration. In some embodiments, the method further comprises receiving, from a further WD, a configuration to monitor the WUS at the first PSFCH occasion occurring at or before the time period, T, before the start of the DRX ON duration. In some embodiments, the time period T refers to an absolute time unit. In some embodiments, the time period T refers to a number of slots within a resource pool, the resource pool comprising the set of dedicated resources.

In some embodiments, the time period T is based on at least one of: a WD processing time, a WD switching time from sleep mode to active mode, a periodicity of PSFCH resources in a resource pool and a resource pool bitmap. In some embodiments, the power saving signal is the GTS; and the method further comprises as a result of detecting the GTS at the PSFCH occasion, switching the WD from the DRX Active state to the DRX Inactive state. In some embodiments, the PSFCH occasion is at a discontinuous reception, DRX, ON duration of a DRX cycle. In some embodiments, the WD is predefined to monitor the GTS at the PSFCH occasion occurring at the DRX ON duration.

In some embodiments, the method further comprises receiving, from a network node, a configuration to monitor the GTS at the PSFCH occasion occurring at the DRX ON duration. In some embodiments, the method further comprises receiving, from a further WD, a configuration to monitor the GTS at the PSFCH occasion occurring at the DRX ON duration. In some embodiments, the method further includes determining the at least one resource based at least in part on an identifier, ID, of the WD, a group identifier, ID, of a group that the WD belongs to, and an ID of a further WD that sends the at least one of the WUS and the GTS.

In some embodiments, the WUS enables the WD to skip a DRX ON duration based at least in part on data being unavailable for the WD during the DRX ON duration; and the GTS enables the WD to enter an early DRX Inactive state based at least in part on data being unavailable for the WD. In some embodiments, the method further includes determining whether to switch between the DRX Inactive state and the DRX Active state based at least in part on a priority associated with a further WD that sends the at least one of the WUS and the GTS. In some embodiments, determining the at least one resource within the PSFCH occasion to monitor for the at least one of the WUS and the GTS based further on predefined values for a subchannel index and a slot index.

In some embodiments, determining the at least one resource within the PSFCH occasion to monitor for the at least one of the WUS and the GTS based further on predefined values for a code. In some embodiments, the set of dedicated resources on which the at least one of the WUS and the GTS is received are orthogonal to PSFCH resources in at least one of a frequency and code domain. In some embodiments, the set of dedicated resources on which the at least one of the WUS and the GTS is received overlaps with PSFCH resources in a time domain, a frequency domain and code domain. In some embodiments, the at least one of the WUS and the GTS is a sequence in a set of contiguous subcarriers or resource blocks in a number of contiguous orthogonal frequency division multiplexed, OFDM, symbols. In some embodiments, the at least one of the WUS and the GTS is a cyclically-shifted base sequence received in a resource block during the PSFCH occasion.

According to yet another aspect, a wireless device, WD, comprising processing circuitry, the processing circuitry configured to cause the WD to perform any one or more of the methods above.

According to another aspect, a method implemented in a wireless device, WD, operating in a sidelink, SL, discontinuous reception, DRX, is provided. The method comprises transmitting, to a further WD, a power saving signal for the SL DRX on at least one resource within a set of dedicated resources at a physical sidelink feedback channel, PSFCH, occasion.

In some embodiments, the power saving signal is at least one of a wake-up-signal, WUS, and a go-to-sleep signal, GTS; and the at least one of the WUS and the GTS indicates to the further WD (22) to switch between a DRX Inactive state and a DRX Active state. In some embodiments, the power saving signal is the WUS; and the WUS indicates to the further WD to switch from the DRX Inactive state to the DRX Active state. In some embodiments, the PSFCH occasion is at a first PSFCH occasion occurring at or before a time period, T, before a start of a discontinuous reception, DRX, ON duration of a DRX cycle.

In some embodiments, the WD is predefined to transmit the WUS at the first PSFCH occasion occurring at or before the time period, T, before the start of the DRX ON duration. In some embodiments, the method further comprises receiving, from a network node, a configuration to transmit the WUS at the first PSFCH occasion occurring at or before the time period, T, before the start of the DRX ON duration. In some embodiments, the method further comprises receiving, from a second WD, a configuration to transmit the WUS at the first PSFCH occasion occurring at or before the time period, T, before the start of the DRX ON duration. In some embodiments, the time period T refers to an absolute time unit.

In some embodiments, the time period T refers to a number of slots within a resource pool, the resource pool comprising the set of dedicated resources. In some embodiments, the time period T is based on at least one of: a WD processing time, a WD switching time from sleep mode to active mode, a periodicity of PSFCH resources in a resource pool and a resource pool bitmap. In some embodiments, the power saving signal is the GTS; and the GTS indicating to the further WD to switch from the DRX Active state to the DRX Inactive state. In some embodiments, the PSFCH occasion is at a discontinuous reception, DRX, ON duration of a DRX cycle. In some embodiments, the WD is predefined to transmit the GTS at the PSFCH occasion occurring at the DRX ON duration.

In some embodiments, the method further comprises receiving, from a network node, a configuration to transmit the GTS at the PSFCH occasion occurring at the DRX ON duration. In some embodiments, the method further comprises receiving, from a second WD, a configuration to transmit the GTS at the PSFCH occasion occurring at the DRX ON duration. In some embodiments, the method further includes determining the at least one resource based at least in part on an identifier, ID, of the further WD, a group identifier, ID, of a group that the further WD belongs to, and an ID of the WD.

In some embodiments, the WUS enables the further WD to skip a DRX ON duration based at least in part on data being unavailable for the further WD during the DRX ON duration; and the GTS enables the further WD to enter an early DRX Inactive state based at least in part on data being unavailable for the further WD. In some embodiments, the switch between the DRX Inactive state and the DRX Active state is based at least in part on a priority associated with the WD. In some embodiments, determining the at least one resource within the PSFCH occasion to transmit the at least one of the WUS and the GTS based further on predefined values for a subchannel index and a slot index.

In some embodiments, determining the at least one resource within the PSFCH occasion to transmit the at least one of the WUS and the GTS based further on predefined values for a code. In some embodiments, the set of dedicated resources on which the at least one of the WUS and the GTS is received are orthogonal to PSFCH resources in at least one of a frequency and code domain. In some embodiments, the set of dedicated resources on which the at least one of the WUS and the GTS is received overlaps with PSFCH resources in a time domain, a frequency domain and code domain. In some embodiments, the at least one of the WUS and the GTS is a sequence in a set of contiguous subcarriers or resource blocks in a number of contiguous orthogonal frequency division multiplexed, OFDM, symbols. In some embodiments, the at least one of the WUS and the GTS is a cyclically-shifted base sequence received in a resource block during the PSFCH occasion.

According to yet another aspect, a wireless device, WD, comprising processing circuitry, the processing circuitry configured to cause the WD to perform any one or more of the methods above.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
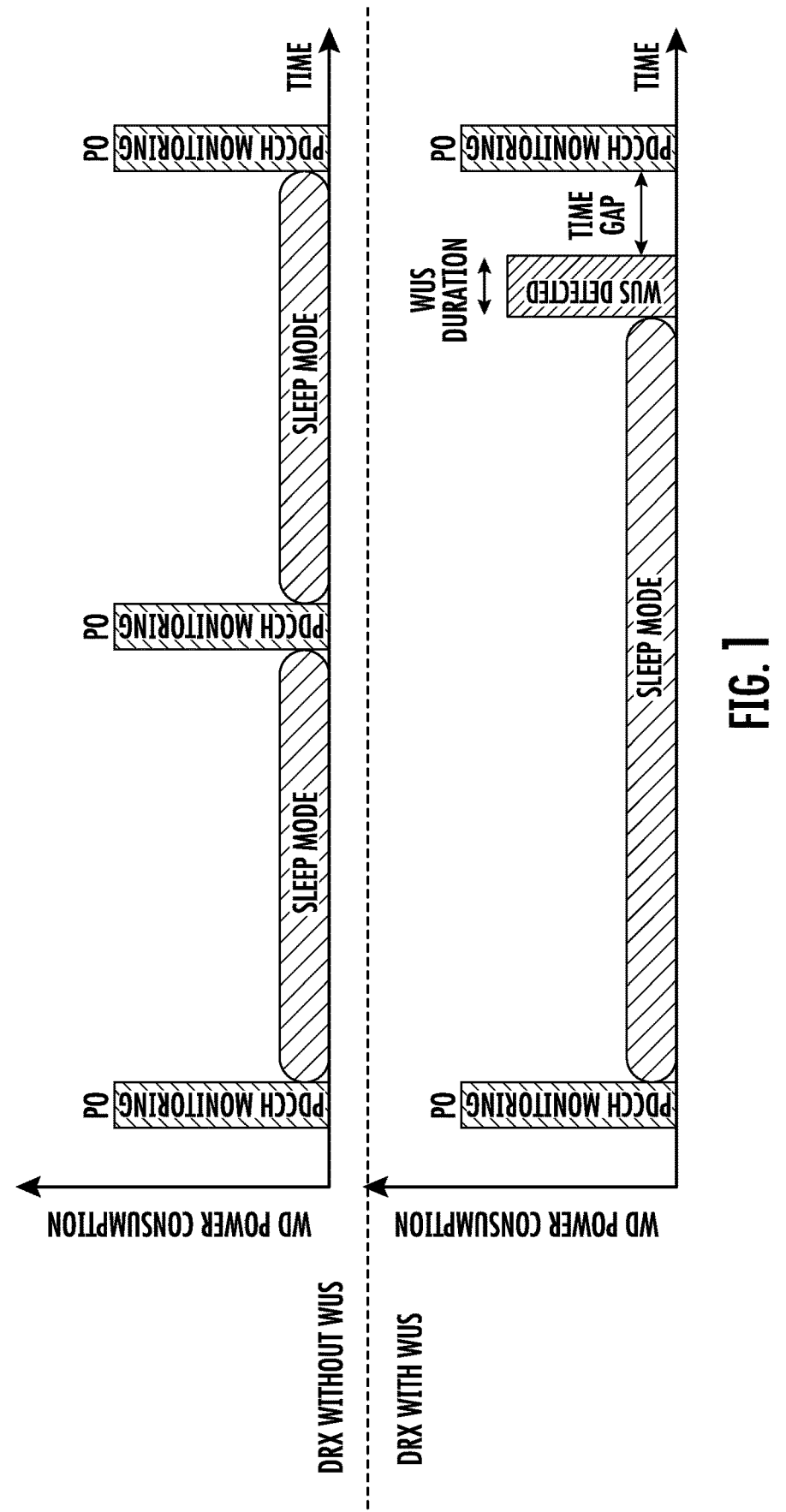
FIG. 1 illustrates an example DRX without WUS (upper and DRX with WUS (lower) for NB-IoT.
Figure 2:
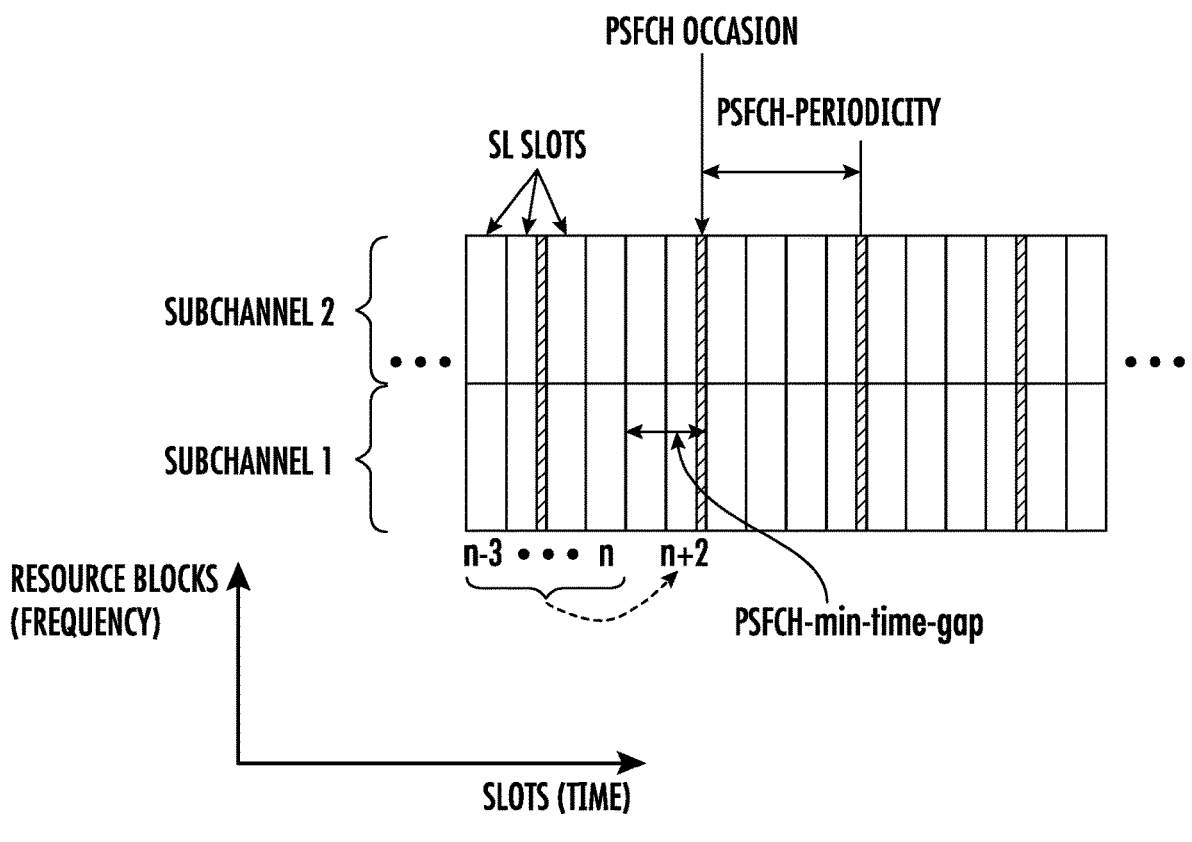
FIG. 2 illustrates an example of a segment of a SL resource pool with two subchannels.

As noted above, 3GPP may develop the first version of DRX for sidelink communications in NR 3GPP Rel-17. The use of WUS/WUC/GTS together with DRX also arises in the SL context since it can potentially help further reduce unnecessary energy consumption at the WDs. In fact, there have been some indications of interest in supporting WUS/WUC for SL in 3GPP.

One way of supporting WUS/WUC/GTS in the SL is mimicking the design of WUS/WUC/GTS for the Uu interface as described above. As such, a new physical signal or control channel is to be defined in the SL and a dedicated search space for this signal/channel needs to be (pre-) configured so that all WDs in the system which are communicating with each other can look for this WUS/WUC/GTS. However, there are several issues with this approach:

Firstly, defining a new physical signal or channel and the related procedures require large updates in the physical layer design, which is not desirable at least in 3GPP Rel-17.

Secondly, introducing new physical signal or channel only targeting 3GPP Rel-17 WDs likely has negative impacts on the performance of 3GPP Rel-16 WDs when both versions of WDs coexist in the same resource pool (which is an important 3GPP Rel-17 SL design target set by 3GPP RAN working group). Specifically, if dedicated resources are used for the WUS/WUC/GTS of 3GPP Rel-17 WDs, the amount of resources usable by Rel-16 WDs will be reduced. On the other hand, if the resources for Rel-17 WUS/WUC/GTS can also be used by 3GPP Rel-16 WDs then the cross-release interference will harm both sides. Especially, interference on the WUS/WUC/GTS can significantly reduce the performance of the WUS/WUC/GTS. Note that, unlike in the Uu interface where the network node, e.g., eNB or the gNB, has control on the interference level on the WUS/WUC/GTS resources (because every transmission is scheduled by the eNB/gNB), the distributed nature of the SL makes the interference on the WUS/WUC/GTS resource essentially unpredictable. The coexistence issue also applies to the coexistence between Rel-17 WDs which support DRX and Rel-17 WDs which do not.

Some embodiments may define a WUS and/or a GTS for SL based on the existing framework for SL HARQ feedback. In particular, in some embodiments, a WUS or a GTS is defined in a similar format as a PSFCH and can be sent in a dedicated set of resources which can be overlapping or non-overlapping with the PSFCH resources. Related procedures may also be defined so that each WD knows when and where to look for the WUS/GTS. Some other rules on WD behaviors related to transmitting and receiving one or multiple WUS/GTS may also be defined.

Some embodiments may advantageously enable WUS and GTS in the SL without requiring a completely new physical signal/channel nor extra dedicated resources incompatible with the existing SL resource structure, hence achieving two targets simultaneously:

further optimizing WD energy consumption on top of DRX, and allowing smooth coexistence of Rel-16 WDs and Rel-17 WDs, or more generally, coexistence between WDs not supporting DRX and WDs supporting DRX, in the same resource pool. In particular, neither a new type of physical signal/channel nor extra dedicated resource may be needed for the WUS in some embodiments.

Moreover, in some embodiments, the same framework can be applied to both unicast and groupcast.

Before describing in detail exemplary embodiments, it is noted that the embodiments reside primarily in combinations of apparatus components and processing steps related to wake-up signal and go-to-sleep signal for sidelink communications. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes"

and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/ multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

A channel may generally be a logical, transport or physical channel. A channel may comprise and/or be arranged on one or more carriers, in particular a plurality of subcarriers. A channel carrying and/or for carrying control signaling/ control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have at least two component channels, one for each direction.

Transmitting in downlink may pertain to transmission from the network or network node to the terminal. The terminal may be considered the WD or UE. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

One or more of the rules for WUS and GTS in SL described herein may be predefined in the context of this disclosure may refer to the related information being defined for example in a standard (e.g., and therefore hardcoded in the device when the device is manufactured), and/or being available without specific configuration from a network or network node, e.g. stored in memory such as in the SIM-card, for example independent of being configured by the network or another device. Configured or configurable may be considered to pertain to the corresponding information being set/configured, e.g. by the network or a network node or another WD.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 3:
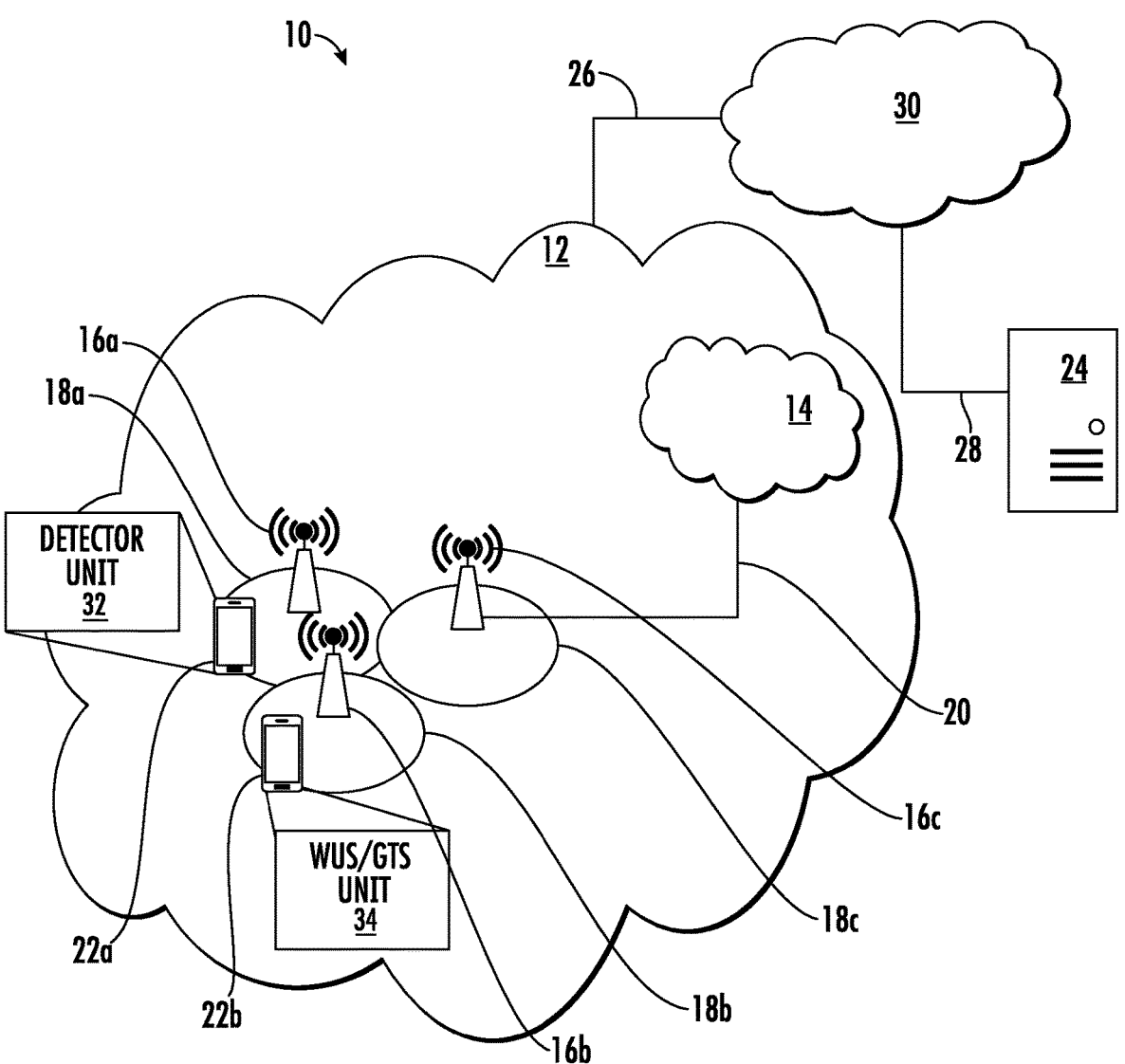
FIG. 3 is a schematic diagram of an exemplary network architecture illustrating a communication system connected via an intermediate network to a host computer according to the principles in the present disclosure.

Some embodiments provide arrangements related to wake-up signal and go-to-sleep signal for sidelink communications. Referring again to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A wireless device 22 is configured to include a detector unit 32 which is configured to receive at least one of a wake-up-signal (WUS) and a go-to-sleep signal (GTS) for sidelink (SL) on at least one resource within a set of dedicated resources during a physical sidelink feedback channel (PSFCH) occasion. A WD 22 is configured to include a WUS/GTS unit 34 which is configured to transmit at least one of a wake-up-signal (WUS) and a go-to-sleep signal (GTS) for sidelink (SL) on at least one resource within a set of dedicated resources during a physical sidelink feedback channel (PSFCH) occasion.

Example implementations, in accordance with an embodiment, of the WD 22, network node 16 and host computer 24 discussed in the preceding paragraphs will now be described with reference to FIG. 4. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to observe, monitor, control, transmit to and/or receive from the network node 16 and/or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include detector unit 32 configured to perform WD methods discussed herein, such as the methods discussed with reference to FIG. 9 as well as other figures. The processing circuitry 84 of the wireless device 22 may include a WUS/GTS unit 34 configured to perform WD methods discussed herein, such as the methods discussed with reference to FIG. 10 as well as other figures.

Figure 4:
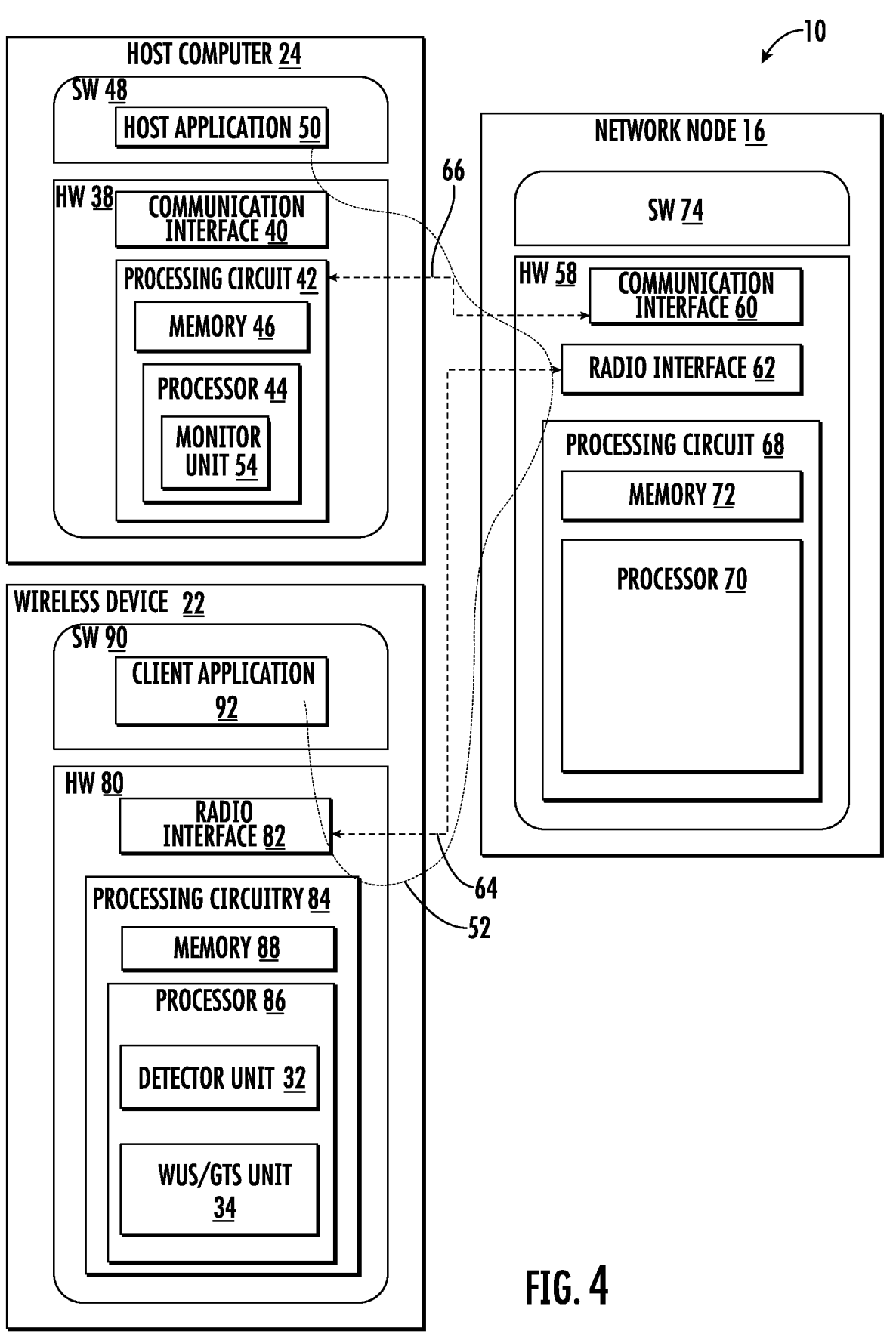
FIG. 4 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 4 and independently, the surrounding network topology may be that of FIG. 3.

In FIG. 4, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 3 and 4 show various "units" such as WUS/GTS unit 34, and detector unit 32 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 5, 6:
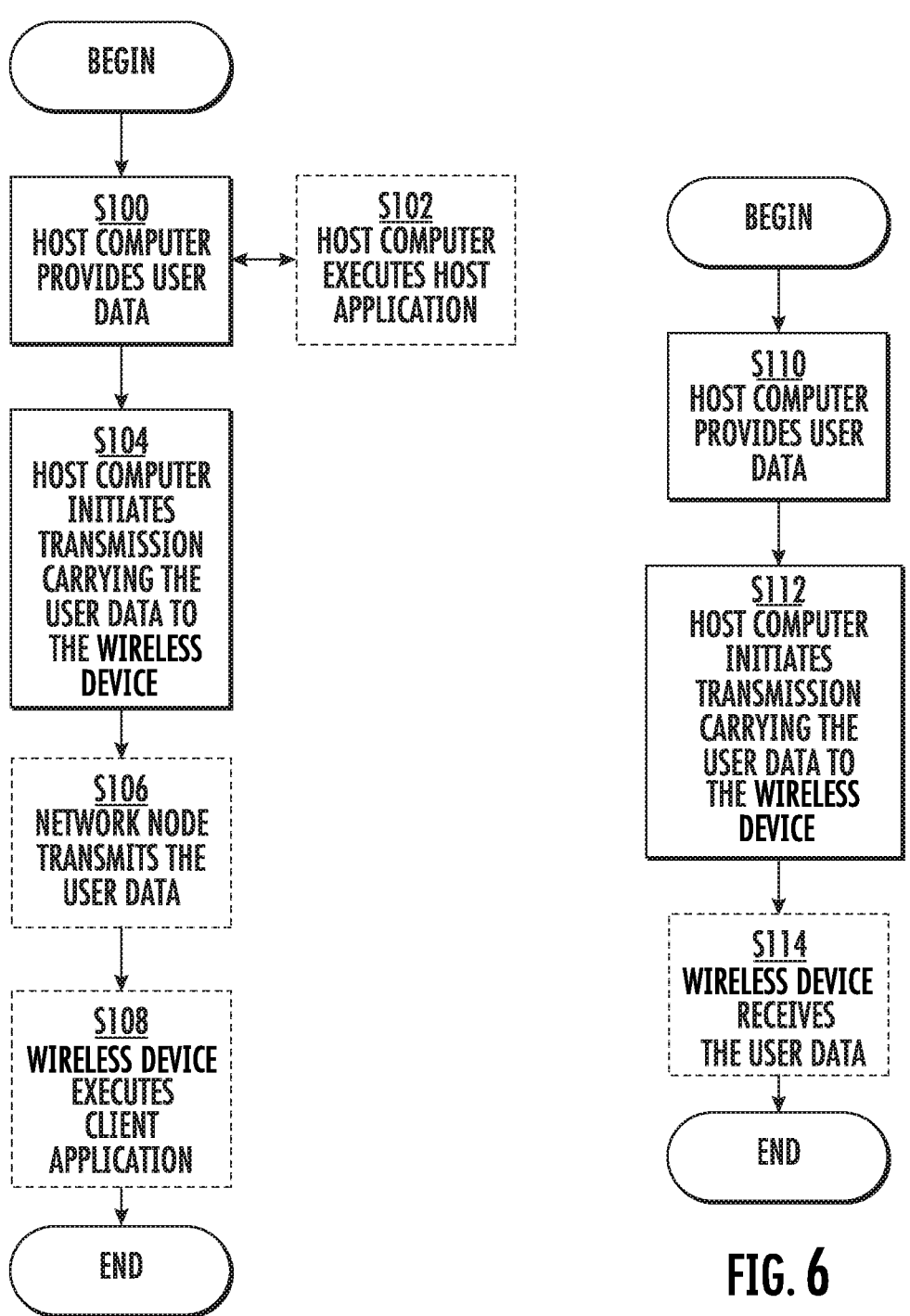
FIG. 5 is a flowchart illustrating exemplary methods implemented in a communication system including a host computer, a network node and a wireless device for executing a client application at a wireless device according to some embodiments of the present disclosure.
FIG. 6 is a flowchart illustrating exemplary methods implemented in a communication system including a host computer, a network node and a wireless device for receiving user data at a wireless device according to some embodiments of the present disclosure.

FIG. 5 is a flowchart illustrating an exemplary method implemented in a communication system, such as, for example, the communication system of FIGS. 3 and 4, in accordance with one embodiment. The communication system may include a host computer 24, a network node 16 and a WD 22, which may be those described with reference to FIG. 4. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 6 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 7, 8:
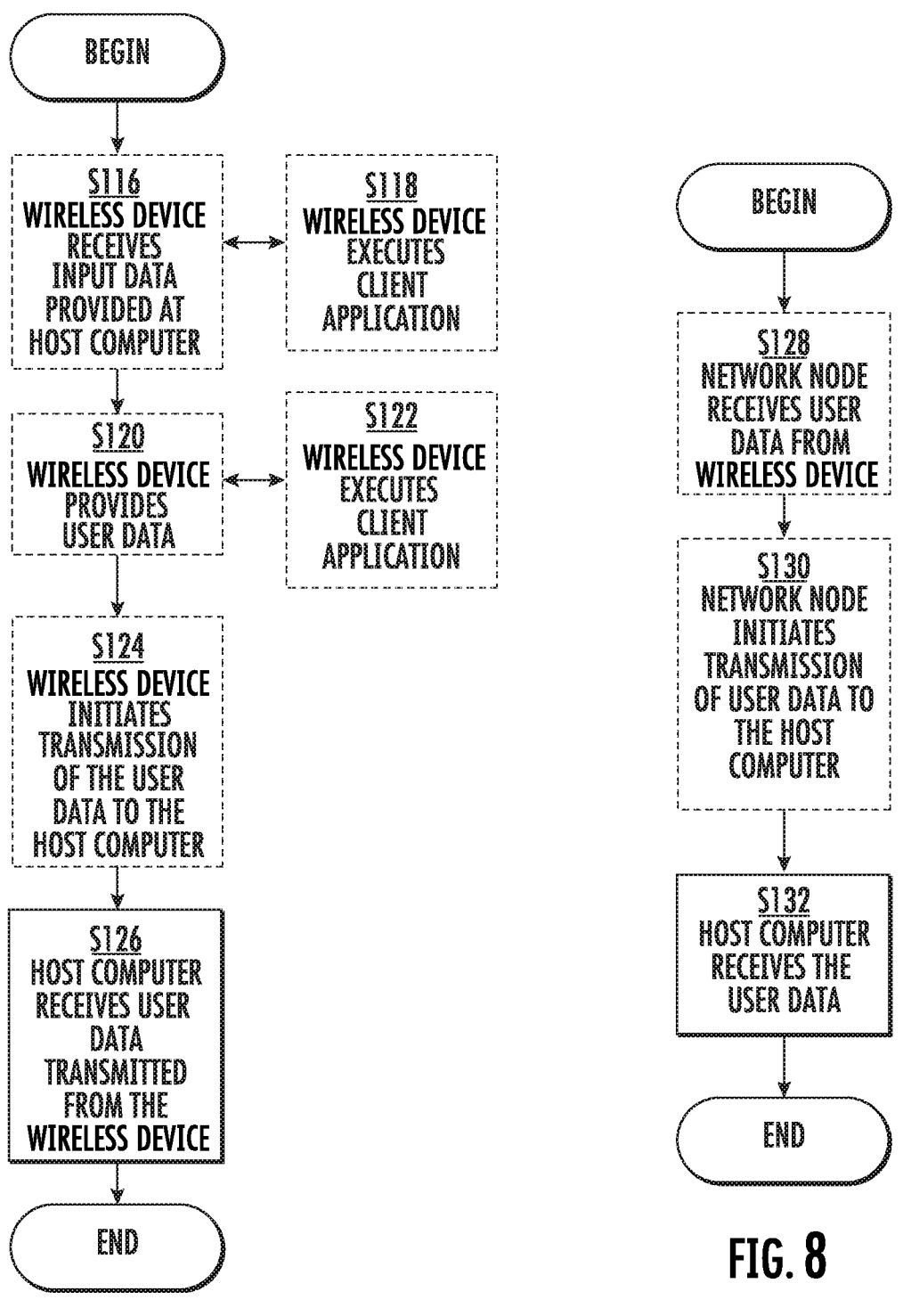
FIG. 7 is a flowchart illustrating exemplary methods implemented in a communication system including a host computer, a network node and a wireless device for receiving user data from the wireless device at a host computer according to some embodiments of the present disclosure.
FIG. 8 is a flowchart illustrating exemplary methods implemented in a communication system including a host computer, a network node and a wireless device for receiving user data at a host computer according to some embodiments of the present disclosure.

FIG. 7 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 8 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 9:
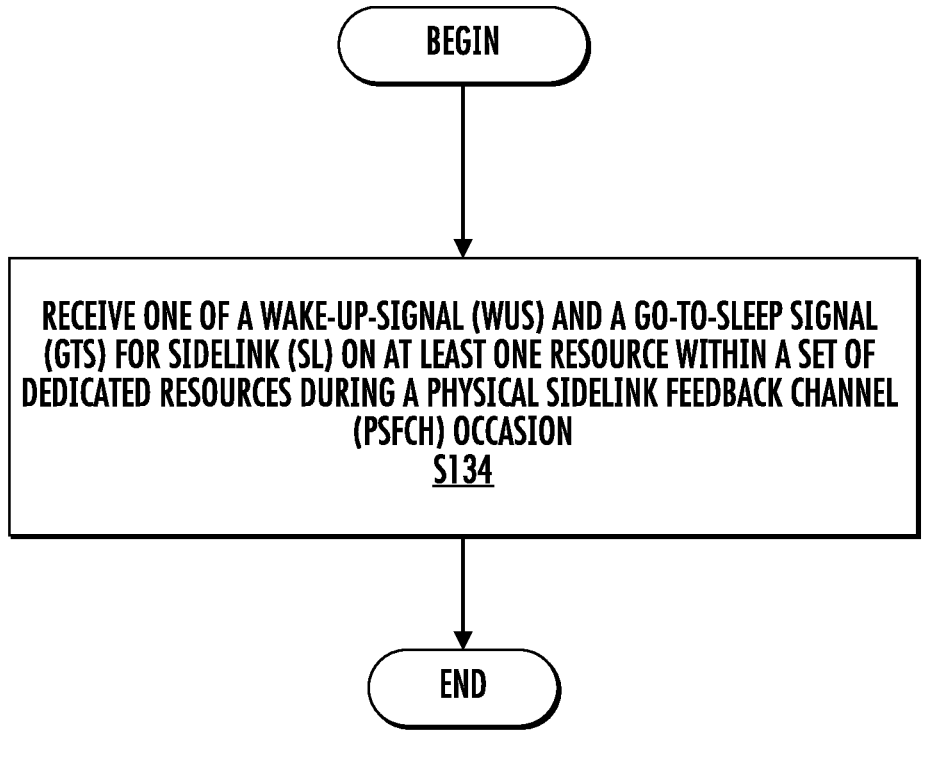
FIG. 9 is a flowchart of an exemplary process in a wireless device according to some embodiments of the present disclosure.

FIG. 9 is a flowchart of an exemplary process in a WD 22 according to some embodiments of the present disclosure. One or more Blocks and/or functions and/or methods performed by the network node 16 may be performed by one or more elements of network node 16 such as by detector unit 32 in processing circuitry 68, processor 70, radio interface 62, etc. according to the example method. The example method includes receiving (Block S134), such as via detector unit 32, processing circuitry 68, processor 70 and/or radio interface 62, one of a wake-up-signal (WUS) and a go-to-sleep signal (GTS) for sidelink (SL) on at least one resource within a set of dedicated resources during a physical sidelink feedback channel (PSFCH) occasion.

In some embodiments, one or more of: the set of dedicated resources for the one of the WUS and the GTS are orthogonal to the PSFCH resources; the set of dedicated resources for the one of the WUS and the GTS overlaps with the PSFCH resources; the one of the WUS and the GTS including a sequence; and/or the set of dedicated resources being compatible with the physical sidelink feedback channel (PSFCH).

Figure 10:
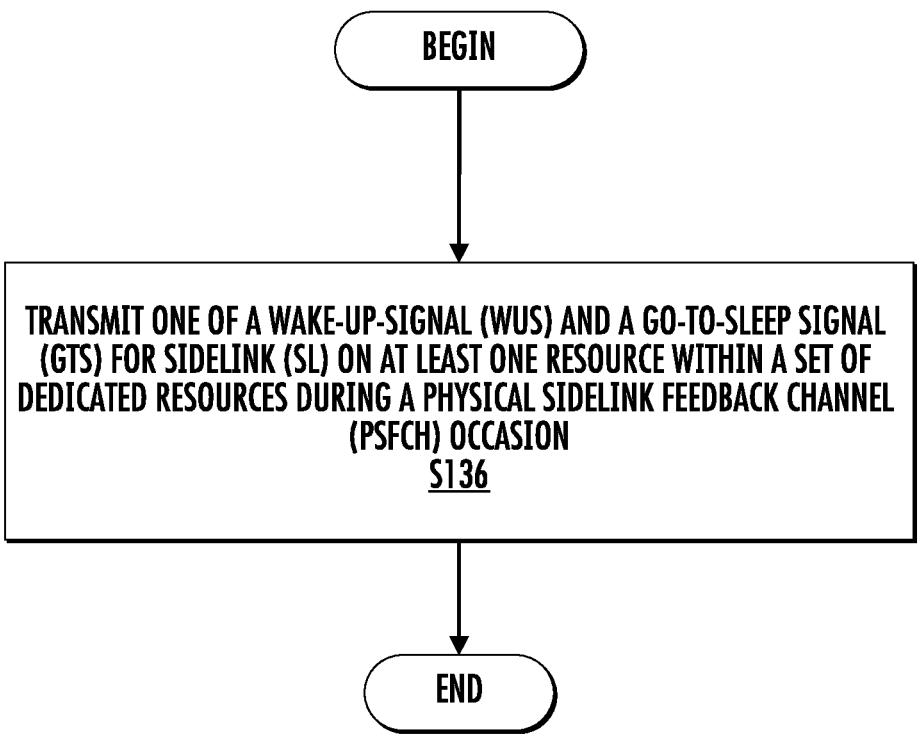
FIG. 10 is a flowchart of an exemplary process in a wireless device according to some embodiments of the present disclosure.

FIG. 10 is a flowchart of an exemplary process in a wireless device 22 according to some embodiments of the present disclosure. One or more Blocks and/or functions and/or methods performed by WD 22 may be performed by one or more elements of WD 22 such as by WUS/GTS unit 34 in processing circuitry 84, processor 86, radio interface 82, etc. The example method includes transmitting (Block S136), such as via WUS/GTS unit 34, processing circuitry 84, processor 86 and/or radio interface 82, one of a wake-up-signal (WUS) and a go-to-sleep signal (GTS) for sidelink (SL) on at least one resource within a set of dedicated resources during a physical sidelink feedback channel (PSFCH) occasion.

In some embodiments, one or more of: the set of dedicated resources for the one of the WUS and the GTS are orthogonal to the PSFCH resources; the set of dedicated resources for the one of the WUS and the GTS overlaps with the PSFCH resources; the one of the WUS and the GTS including a sequence; and/or the set of dedicated resources being compatible with the physical sidelink feedback channel (PSFCH).

Figure 11:
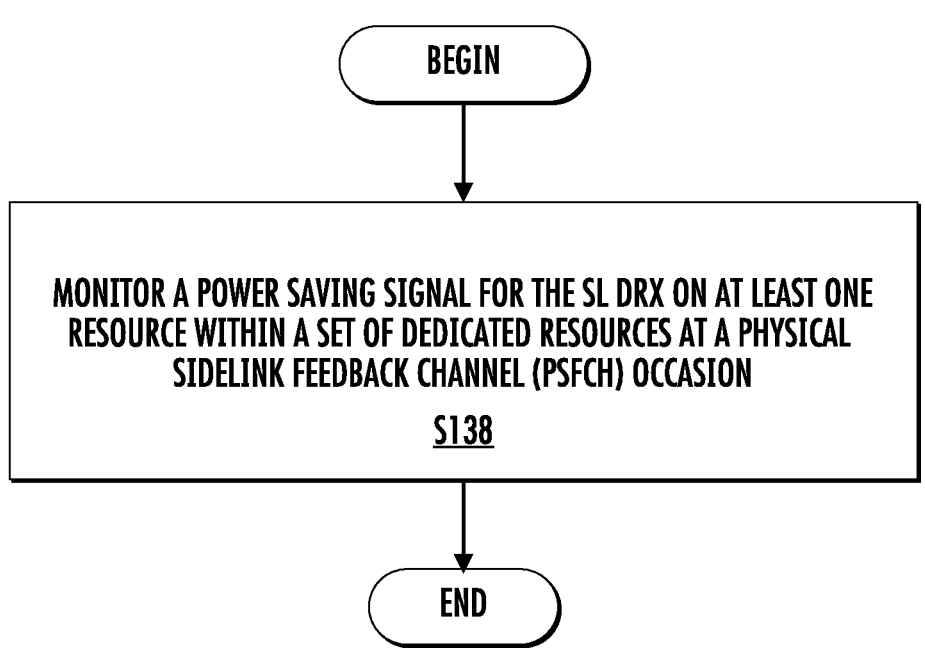
FIG. 11 is a flowchart of an exemplary process in a wireless device according to some embodiments of the present disclosure.

FIG. 11 is a flowchart of an exemplary process in a wireless device 22 according to some embodiments of the present disclosure. One or more Blocks and/or functions and/or methods performed by WD 22 may be performed by one or more elements of WD 22 such as by WUS/GTS unit 34 in processing circuitry 84, processor 86, radio interface 82, etc. The example method includes monitoring (Block S138), such as via WUS/GTS unit 34, processing circuitry 84, processor 86 and/or radio interface 82, a power saving signal for the SL DRX on at least one resource within a set of dedicated resources at a physical sidelink feedback channel, PSFCH, occasion.

In some embodiments, the power saving signal is at least one of a wake-up-signal, WUS, and a go-to-sleep signal, GTS; and the method further comprises as a result of detecting the at least one of the WUS and the GTS, switching, such as via WUS/GTS unit 34, processing circuitry 84, processor 86 and/or radio interface 82, between a DRX Inactive state and a DRX Active state.

In some embodiments, the power saving signal is the WUS; and the method further comprises as a result of detecting the WUS at the PSFCH occasion, switching, such as via WUS/GTS unit 34, processing circuitry 84, processor 86 and/or radio interface 82, the WD from the DRX Inactive state to the DRX Active state. In some embodiments, the PSFCH occasion is at a first PSFCH occasion occurring at or before a time period, T, before a start of a discontinuous reception, DRX, ON duration of a DRX cycle. In some embodiments, the WD is predefined to monitor the WUS at the first PSFCH occasion occurring at or before the time period, T, before the start of the DRX ON duration. In some embodiments, the method further comprises receiving, such as via WUS/GTS unit 34, processing circuitry 84, processor 86 and/or radio interface 82, from a network node, a configuration to monitor the WUS at the first PSFCH occasion occurring at or before the time period, T, before the start of the DRX ON duration.

In some embodiments, the method further comprises receiving, such as via WUS/GTS unit 34, processing circuitry 84, processor 86 and/or radio interface 82, from a further WD, a configuration to monitor the WUS at the first PSFCH occasion occurring at or before the time period, T, before the start of the DRX ON duration. In some embodiments, the time period T refers to an absolute time unit. In some embodiments, the time period T refers to a number of slots within a resource pool, the resource pool comprising the set of dedicated resources. In some embodiments, the time period T is based on at least one of: a WD processing time, a WD switching time from sleep mode to active mode, a periodicity of PSFCH resources in a resource pool and a resource pool bitmap.

In some embodiments, the power saving signal is the GTS; and the method further comprises as a result of detecting the GTS at the PSFCH occasion, switching, such as via WUS/GTS unit 34, processing circuitry 84, processor 86 and/or radio interface 82, the WD from the DRX Active state to the DRX Inactive state. In some embodiments, the PSFCH occasion is at a discontinuous reception, DRX, ON duration of a DRX cycle. In some embodiments, the WD is predefined to monitor the GTS at the PSFCH occasion occurring at the DRX ON duration. In some embodiments, the method further comprises receiving, such as via WUS/ GTS unit 34, processing circuitry 84, processor 86 and/or radio interface 82, from a network node, a configuration to monitor the GTS at the PSFCH occasion occurring at the DRX ON duration. In some embodiments, the method further comprises receiving, such as via WUS/GTS unit 34, processing circuitry 84, processor 86 and/or radio interface 82, from a further WD, a configuration to monitor the GTS at the PSFCH occasion occurring at the DRX ON duration.

In some embodiments, the method further includes determining, such as via WUS/GTS unit 34, processing circuitry 84, processor 86 and/or radio interface 82, the at least one resource based at least in part on an identifier, ID, of the WD, a group identifier, ID, of a group that the WD belongs to, and an ID of a further WD that sends the at least one of the WUS and the GTS. In some embodiments, the WUS enables the WD to skip a DRX ON duration based at least in part on data being unavailable for the WD during the DRX ON duration; and the GTS enables the WD to enter an early DRX Inactive state based at least in part on data being unavailable for the WD. In some embodiments, the method further includes determining, such as via WUS/GTS unit 34, processing circuitry 84, processor 86 and/or radio interface 82, whether to switch between the DRX Inactive state and the DRX Active state based at least in part on a priority associated with a further WD that sends the at least one of the WUS and the GTS.

In some embodiments, determining, such as via WUS/ GTS unit 34, processing circuitry 84, processor 86 and/or radio interface 82, the at least one resource within the PSFCH occasion to monitor for the at least one of the WUS and the GTS based further on predefined values for a subchannel index and a slot index. In some embodiments, determining, such as via WUS/GTS unit 34, processing circuitry 84, processor 86 and/or radio interface 82, the at least one resource within the PSFCH occasion to monitor for the at least one of the WUS and the GTS based further on predefined values for a code.

In some embodiments, the set of dedicated resources on which the at least one of the WUS and the GTS is received are orthogonal to PSFCH resources in at least one of a frequency and code domain. In some embodiments, the set of dedicated resources on which the at least one of the WUS and the GTS is received overlaps with PSFCH resources in a time domain, a frequency domain and code domain. In some embodiments, the at least one of the WUS and the GTS is a sequence in a set of contiguous subcarriers or resource blocks in a number of contiguous orthogonal frequency division multiplexed, OFDM, symbols. In some embodiments, the at least one of the WUS and the GTS is a cyclically-shifted base sequence received in a resource block during the PSFCH occasion.

Figure 12:
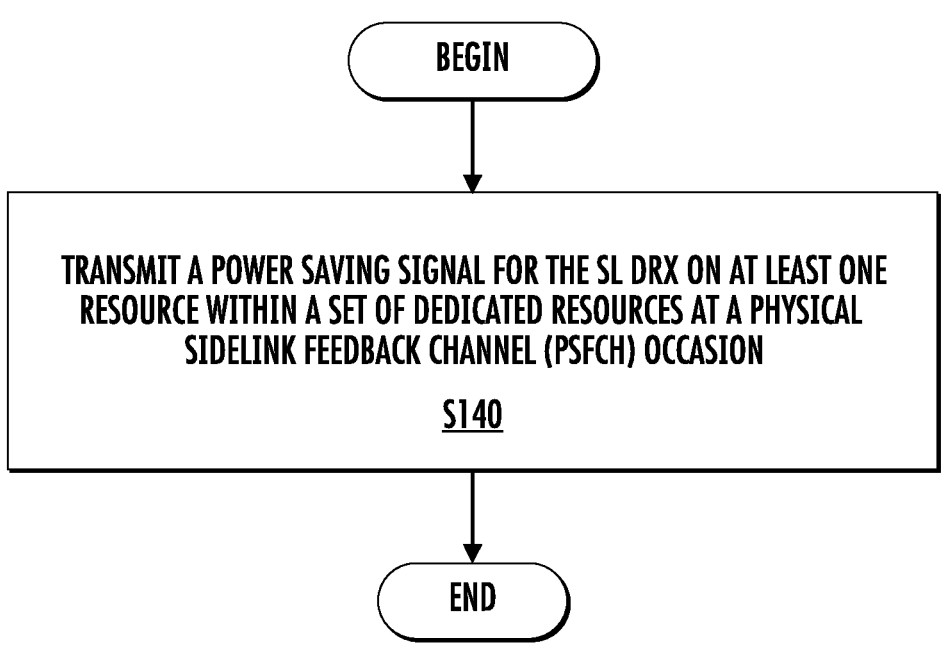
FIG. 12 is a flowchart of an exemplary process in a wireless device according to some embodiments of the present disclosure.

FIG. 12 is a flowchart of an exemplary process in a wireless device 22 according to some embodiments of the present disclosure. One or more Blocks and/or functions and/or methods performed by WD 22 may be performed by one or more elements of WD 22 such as by WUS/GTS unit 34 in processing circuitry 84, processor 86, radio interface 82, etc. The example method includes transmitting (Block S140), such as via WUS/GTS unit 34, processing circuitry 84, processor 86 and/or radio interface 82, to a further WD, a power saving signal for the SL DRX on at least one resource within a set of dedicated resources at a physical sidelink feedback channel, PSFCH, occasion.

In some embodiments, the power saving signal is at least one of a wake-up-signal, WUS, and a go-to-sleep signal, GTS; and the at least one of the WUS and the GTS indicates to the further WD (22) to switch between a DRX Inactive state and a DRX Active state.

In some embodiments, the power saving signal is the WUS; and the WUS indicates to the further WD to switch from the DRX Inactive state to the DRX Active state. In some embodiments, the PSFCH occasion is at a first PSFCH occasion occurring at or before a time period, T, before a start of a discontinuous reception, DRX, ON duration of a DRX cycle. In some embodiments, the WD is predefined to transmit the WUS at the first PSFCH occasion occurring at or before the time period, T, before the start of the DRX ON duration. In some embodiments, the method further comprises receiving, such as via WUS/GTS unit 34, processing circuitry 84, processor 86 and/or radio interface 82, from a network node, a configuration to transmit the WUS at the first PSFCH occasion occurring at or before the time period, T, before the start of the DRX ON duration.

In some embodiments, the method further comprises receiving, such as via WUS/GTS unit 34, processing circuitry 84, processor 86 and/or radio interface 82, from a second WD, a configuration to transmit the WUS at the first PSFCH occasion occurring at or before the time period, T, before the start of the DRX ON duration. In some embodiments, the time period T refers to an absolute time unit. In some embodiments, the time period T refers to a number of slots within a resource pool, the resource pool comprising the set of dedicated resources. In some embodiments, the time period T is based on at least one of: a WD processing time, a WD switching time from sleep mode to active mode, a periodicity of PSFCH resources in a resource pool and a resource pool bitmap.

In some embodiments, the power saving signal is the GTS; and the GTS indicating to the further WD to switch from the DRX Active state to the DRX Inactive state. In some embodiments, the PSFCH occasion is at a discontinuous reception, DRX, ON duration of a DRX cycle. In some embodiments, the WD is predefined to transmit the GTS at the PSFCH occasion occurring at the DRX ON duration. In some embodiments, the method further comprises receiving, such as via WUS/GTS unit 34, processing circuitry 84, processor 86 and/or radio interface 82, from a network node, a configuration to transmit the GTS at the PSFCH occasion occurring at the DRX ON duration. In some embodiments, the method further comprises receiving, such as via WUS/ GTS unit 34, processing circuitry 84, processor 86 and/or radio interface 82, from a second WD, a configuration to transmit the GTS at the PSFCH occasion occurring at the DRX ON duration.

In some embodiments, the method further includes determining the at least one resource based at least in part on an identifier, ID, of the further WD, a group identifier, ID, of a group that the further WD belongs to, and an ID of the WD. In some embodiments, the WUS enables the further WD to skip a DRX ON duration based at least in part on data being unavailable for the further WD during the DRX ON duration; and the GTS enables the further WD to enter an early DRX Inactive state based at least in part on data being unavailable for the further WD. In some embodiments, the switch between the DRX Inactive state and the DRX Active state is based at least in part on a priority associated with the WD.

In some embodiments, determining, such as via WUS/ GTS unit 34, processing circuitry 84, processor 86 and/or radio interface 82, the at least one resource within the PSFCH occasion to transmit the at least one of the WUS and the GTS based further on predefined values for a subchannel index and a slot index. In some embodiments, determining, such as via WUS/GTS unit 34, processing circuitry 84, processor 86 and/or radio interface 82, the at least one resource within the PSFCH occasion to transmit the at least one of the WUS and the GTS based further on predefined values for a code.

In some embodiments, the set of dedicated resources on which the at least one of the WUS and the GTS is received are orthogonal to PSFCH resources in at least one of a frequency and code domain. In some embodiments, the set of dedicated resources on which the at least one of the WUS and the GTS is received overlaps with PSFCH resources in a time domain, a frequency domain and code domain. In some embodiments, the at least one of the WUS and the GTS is a sequence in a set of contiguous subcarriers or resource blocks in a number of contiguous orthogonal frequency division multiplexed, OFDM, symbols. In some embodiments, the at least one of the WUS and the GTS is a cyclically-shifted base sequence received in a resource block during the PSFCH occasion.

Having described the general process flow of arrangements of the disclosure and having provided examples of hardware and software arrangements for implementing the processes and functions of the disclosure, the sections below provide details and examples of arrangements for wake-up signal and go-to-sleep signal for sidelink communications, which may be implemented by the network node 16, wireless device 22 and/or host computer 24.

Some embodiments of the disclosure are presented in the context of DRX, but they may be applied to any communication mode where a node turns on and off (parts of) its receiver in a regular manner.

In some embodiments, the following terms are used interchangeably: "DRX ON", "DRX Active mode", "wake-up mode" and "Active time"; and the terms "DRX OFF", "DRX Inactive mode", "Idle mode", "Sleep mode", "Inactive time" and "sleep time" may also be used interchangeably in some embodiments. In some embodiments, WUS or GTS used in this section is in the context of sidelink.

Hereafter, Tx WD 22 and Rx WD 22 denote the transmitter WD 22 and the receiver WD 22 (of a packet, a signal, etc.), respectively.

In some embodiments, at a high level, the present disclosure provides an arrangement in which a sidelink wake-up signal (SL WUS or WUS for short) and a sidelink go-to-sleep signal (SL GTS or GTS for short) are defined in the form of a sequence and are sent in a set of dedicated resources compatible with the existing PSFCH resource structure of NR SL.

In some embodiments, this means either the WUS/GTS resources are orthogonal to the PSFCH resources (e.g., separated in time and/or frequency and/or code domain) or the WUS/GTS resources overlap with the PSFCH resources but do not disrupt the existing PSFCH transmission/reception protocol.

In an example, a WUS/GTS is a pseudo PSFCH (i.e., a PSFCH without an associated PSCCH/PSSCH) and is sent in a certain PSFCH occasion, using the same set of resource blocks as that used by actual PSFCHs.

In another example, a WUS/GTS is a pseudo PSFCH (i.e., a PSFCH without an associated PSCCH/PSSCH) and is sent in a certain PSFCH occasion, using a different set of resource blocks as that used by actual PSFCHs. (Note that it is not necessary that all resource blocks in a PSFCH occasion are used for PSFCHs, as discussed above).

In both examples above, the WUS/GTS resources are contained in a PSFCH occasion and a WD 22 supporting SL DRX may be configured to perform one of or both of the following actions:

1) Monitor a specific PSFCH occasion prior to the starting of a new DRX cycle for a SL WUS sent by another WD 22. If a SL WUS is detected, the monitoring WD 22 wakes up in the Active time of the next DRX cycle to monitor sidelink control information, otherwise the WD 22 continues being in the sleep mode (i.e., in the DRX Inactive mode).

2) Monitor every PSFCH occasion during the DRX ON duration of a DRX cycle for a GTS sent by another WD 22, except the PSFCH occasions in which the WD 22 expects a PSFCH carrying HARQ feedback for an earlier PSCCH/PSSCH transmission from the WD 22. If the GTS is detected, the monitoring WD 22 switches to sleep mode early/prematurely.

Some embodiments presented below can be combined in various ways.

In some embodiments, the use of resource pools may be used in this disclosure, at least in the following regard. In some places, the disclosure states that a signal (e.g., WUS) is transmitted T time units (e.g., T slots or symbols) before a certain time (e.g., the time of the start of the DRX ON). This may refer to absolute time units or to time units belonging to the resource pool. For example, for T=1 a WUS may be transmitted in the last slot that belongs to the resource pool and that takes place before the start of the DRX ON.

Some Example Embodiments for SL WUS

Some embodiments related to the physical format of the SL WUS may include:

In an embodiment, a SL WUS is defined as a sequence transmitted in a set of contiguous subcarriers or resource blocks in a number of contiguous OFDM symbols.

In an embodiment, a SL WUS is defined by reusing the physical format of the NR Rel-16 PSFCH (i.e., a cyclically-shifted version of a low-peak-to-average-power ratio (low-PAPR) base sequence sent in a resource block) and is transmitted in a PSFCH occasion.

In a sub-embodiment, the SL WUS conveys a pseudo NACK feedback. In another sub embodiment, the SL WUS conveys a pseudo ACK feedback.

In one embodiment, the SL WUS is transmitted on a dedicated resource that is separately configured from the PSFCH resources. For example, the SL WUS may be transmitted in the same slot and symbol as PSFCH but it may be separated in frequency or code domain (e.g., using a different cyclic shift).

EXAMPLE Embodiments Related to Behaviors of the WD 22 Receiving (i.e., Targeted by) a SL WUS In an embodiment, a WD 22 with SL DRX enabled is configured to search for a SL WUS in a dedicated resource (e.g., dedicated symbol/slot and/or RB and/or CS) occurring at a time gap before the start of a DRX cycle of the WD 22 (i.e., the start of the DRX ON of the DRX cycle), the resource is determined based on a mapping rule.

In an embodiment, the WD 22 is configured to search for a SL WUS in a PSFCH occasion occurring at a time gap before the start of a DRX cycle of the WD 22 (i.e., the start of the DRX ON of the DRX cycle), wherein the WUS resource within the PSFCH occasion is determined based on a mapping rule.

In a sub-embodiment, the set of resource blocks containing the WUS in the PSFCH occasion is the same set of resource blocks used for actual PSFCHs.

In a sub-embodiment, the set of resource blocks containing the WUS in the PSFCH occasion is orthogonal to the set of resource blocks used for actual PSFCHs.

Furthermore, in Some Embodiments:

If the SL WUS is detected, the WD 22 enters the Active state when the DRX cycle starts.

If the SL WUS is not detected, the WD 22 stays in the Inactive state (i.e., sleep mode).

Figure 13:
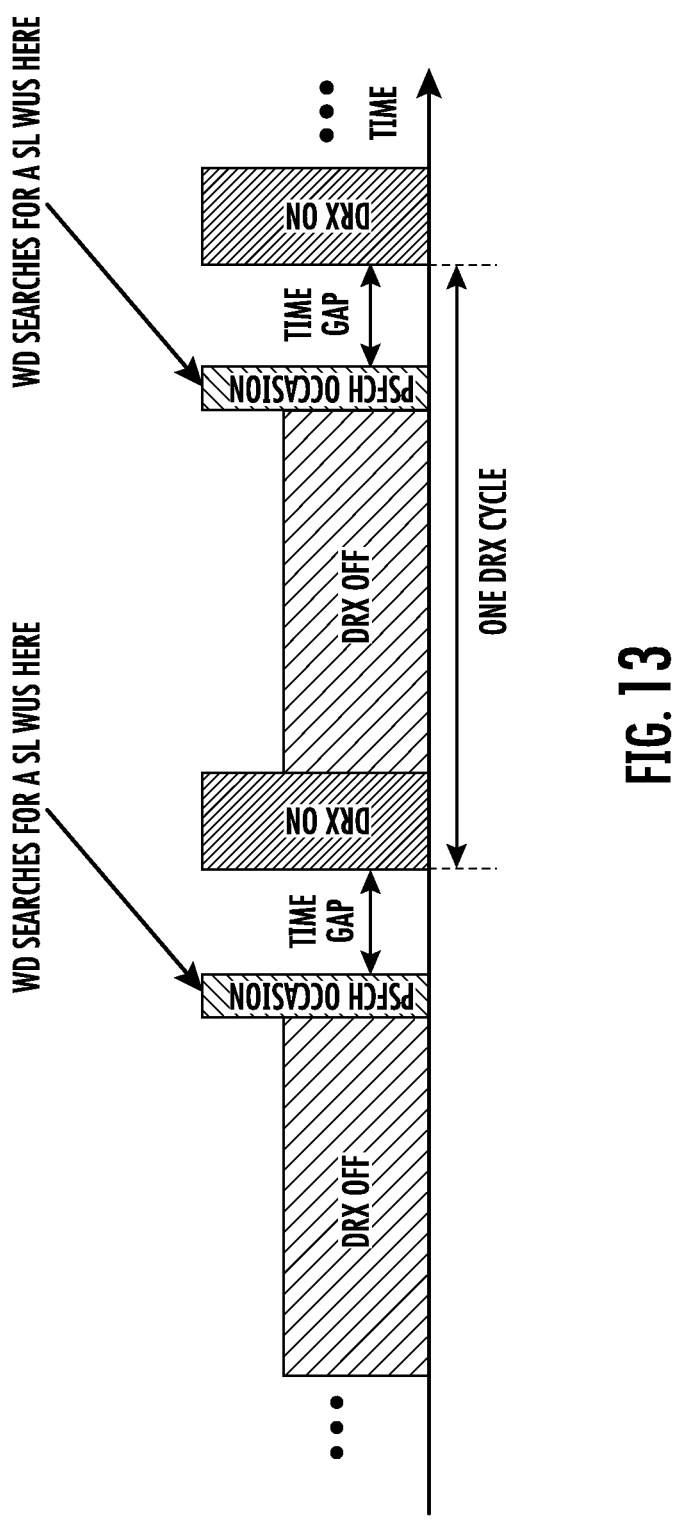
FIG. 13 illustrates an example timing of SL WUS according to some embodiments.

FIG. 13 illustrates an example conceptual timing relation between the SL WUS and the start of the DRX cycle for a WD 22 in the case the WUS resource is in a PSFCH occasion. The actual time gap may depend on several aspects as proposed in the related embodiments. The time gap for different DRX cycles may have different lengths.

In one embodiment, the mapping rule depends on some parameters of the DRX configuration. For example, the resource for the WUS may reoccur with the periodicity of the DRX configuration. Or it may depend on a time offset that is part of the DRX configuration.

In an embodiment, the time gap may be determined based at least on one of: WD 22 processing time of the SL WUS, WD 22 switching time from sleep mode to active mode, periodicity of PSFCH resources in the resource pool, a resource pool bitmap. As an example, the slot or OFDM symbols in which the WD 22 searches for a SL WUS is the PSFCH occasion appears in a slot (or in an OFDM symbol) with index n-T, where n is a slot index (or an OFDM symbol index) of the start of the DRX ON, T is the smallest integer larger than or equal to K and K is a (pre-)configured integer whose value is based on at least one of: WD 22 processing time of the SL WUS, WD 22 switching time from sleep mode to active mode, periodicity of PSFCH resources in the resource pool. Note that under this rule, the time gap for different DRX cycles may have different lengths.

In an embodiment of the mapping rule, the WUS resource is determined based at least on one of: an ID of the WD 22, a group ID of a group that the WD 22 belongs to, an ID of the WD 22 sending the WUS.

In an embodiment of the mapping rule, the WUS resource is determined by following the procedure for determining a PSFCH resource of SL Rel-16 with one or more of the following adaptations:

The parameter Layer-1 ID of the Tx WD is replaced by the Layer-1 ID of the WD 22 or a Group ID of a group that the WD 22 belongs to.

The parameter member ID of the Rx WD for groupcast feedback option 2 (which is set to 0 for unicast and groupcast option 1) is replaced by the member ID of the WD 22 in a group.

The parameters subchannel index and slot index of the associated PSSCH is replaced by some pre-defined values. For example, the subchannel index and slot index corresponding to the first subchannel in the first PSSCH slot associated with the PSFCH occasion.

Additionally, the CS in a pair of CS is determined based on whether the SL WUS is a pseudo ACK or a pseudo NACK.

In some embodiments, this particular way of setting parameters helps ensure that the chance that a WUS targeting a WD 22 is mistaken with a real PSFCH targeting another WD 22 is minimized because the WUS resource depends solely on the IDs of the WD 22 targeted by the WUS (not on some other WD's 22 ID).

In a more concrete embodiment of the mapping rule, the WUS resource may be determined by following the WD 22 procedure for reporting HARQ-ACK on sidelink in NR Rel-16 (Section 16.3, 3GPP TS 38.213 V16.3.0) with the following input parameters:

In some embodiments, slot i and subchannel j may be fixed. For example, i=0 and j=0, corresponding to the first subchannel in the first PSSCH slot associated with the PSFCH occasion. See FIG. 14 as an example illustration.

In some embodiments, slot i and subchannel j may be obtained from a function of the WD 22 ID.

In some embodiments, $P_{ID}$ may be the physical layer ID of the WD 22. For example, this can be used when the WD 22 is participating in a unicast SL communication with a further WD 22. This option of $P_{ID}$ can also be used when the WD 22 is participating in a groupcast SL communication.

In some embodiments, $P_{ID}$ may be the physical layer destination group ID associated with a group of WDs 22 to which the WD 22 belongs. For example, when the WD 22 is participating in a groupcast SL communication with which a physical layer destination group ID is associated.

In some embodiments, $M_{ID}$ may be the identity of the WD 22 within a groupcast as indicated by higher layers (also referred to as the member ID).

In some embodiments, $M_{ID}$ equals 0. This is applicable when the WD 22 is participating in a unicast or groupcast SL communication.

In some embodiments, $m_{cs}=0$, i.e., the SL WUS resembles a PSFCH carrying a NACK. In some other embodiments, $m_{cs}=6$, i.e., the SL WUS resembles a PSFCH carrying an ACK.

Table 1 below summarizes an example of different possible combinations of $P_{ID}$ and $M_{ID}$ and their use for unicast/groupcast.

Figure 14:
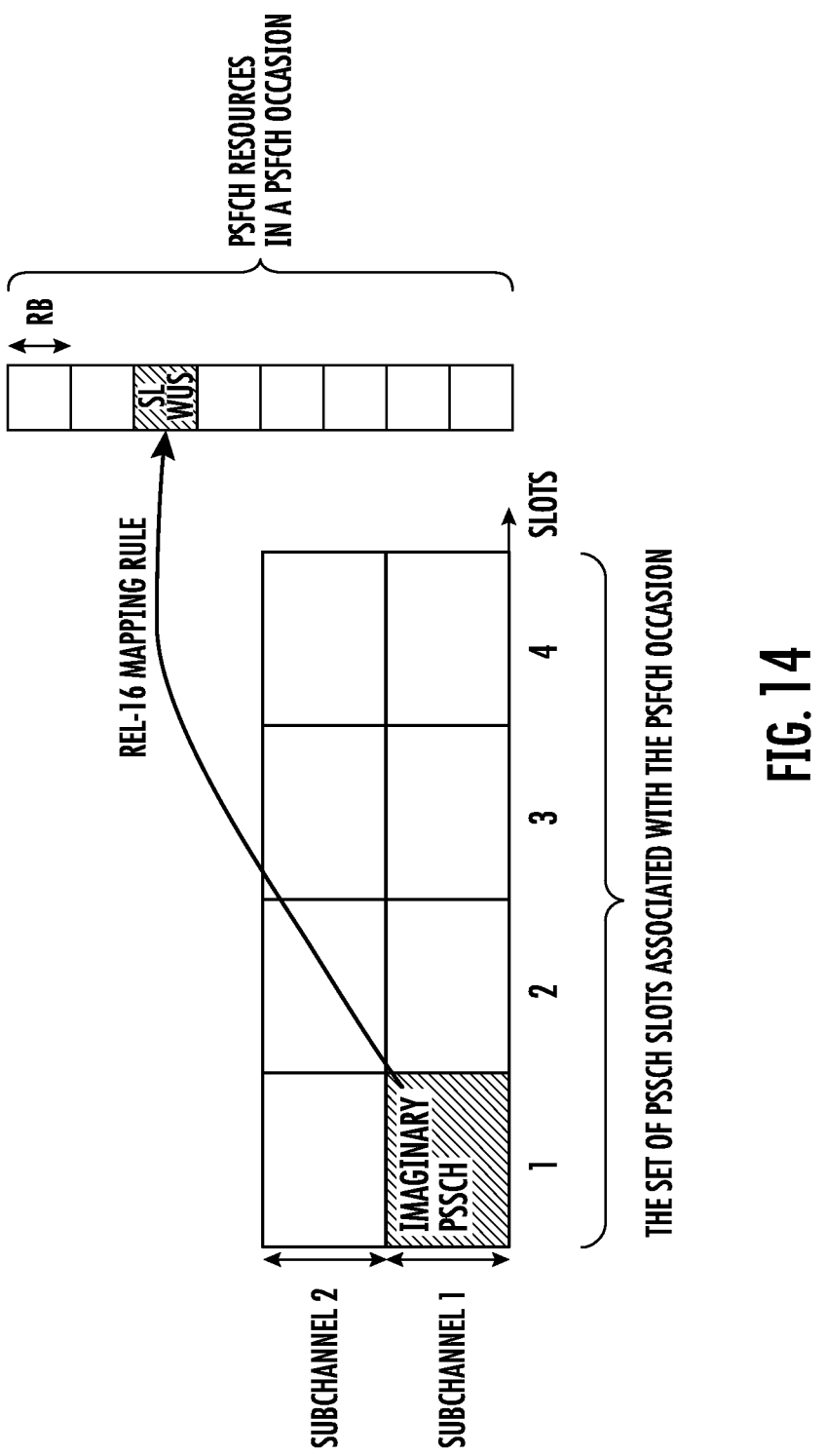
FIG. 14 illustrates an example of an imaginary PSSCH whose slot index and subchannel index are used in the mapping rule to determine the resource to transmit the SL WUS according to some embodiments.

FIG. 14 illustrates an example of an imaginary PSSCH whose slot index and subchannel index (in this case i=0, j=0) are used in the mapping rule to determine the resource to transmit the SL WUS (i.e., determine the WUS resource.)

TABLE 1

Combinations of $P_{ID}$ and $M_{ID}$ when using for SL WUS and their applicability for unicast/groupcast.

| $P_{ID}$ | $M_{ID}$ | Applicable casting type |
|---|---|---|
| Physical layer ID of the WD | 0 | Unicast, groupcast |
| Physical layer ID of the WD | Identity of the WD within a groupcast | Unicast, groupcast |
| Physical layer destination group ID. The WD belongs to this group. | 0 | Groupcast (e.g., when the transmitter WD in the group wants to wake up all receiver WDs) |
| Physical layer destination group ID. The WD belongs to this group. | Identity of the WD within a groupcast | Groupcast (e.g., when the transmitter WD in the group wants to wake up a particular receiver WD.) |

In an embodiment, the WD 22 searches for multiple SL WUS in the same slot or the same set of OFDM symbols. For example, if the WD 22 is participating in multiple SL unicast and/or groupcast sessions with other WDs 22. In one case, the WD 22 enters the Active state if at least one SL WUS is detected. In another case, the WD 22 enters the Active state if a certain number of SL WUS is detected.

In an embodiment, when the mapping rule is based at least on the ID of a further WD 22 sending the SL WUS (hence the WUSs from different further WDs 22 are sent in different resources), the WD 22 determines to wake up or not based on which further WD 22 the WUS comes from. For example, when the WD 22 is communicating with several further WDs 22 in parallel, the WD 22 may have different priorities for the different further WDs 22 and the WD 22 may wake up every time it receives a WUS from a high-priority further WD 22 and only wakes up sporadically in response to WUS from a low-priority further WD 22. In some examples, the priority can be based on the priority of the messages coming from the further WD 22 in the past or on the nature of the communication with the further WD 22 (e.g., unicast or groupcast or broadcast).

In an embodiment, the time gap or the mapping rule may be configured by a network node or pre-configured (e.g., via a subscriber identity module (SIM) card).

Some Example Embodiments Related to Behavior of WD 22 Transmitting the SL WUS In an embodiment, a WD 22 transmits a SL WUS to wake up a further WD 22 in a dedicated resource (e.g., dedicated symbol/slot and/or RB and/or CS) occurring at a time gap prior to the start of the next DRX cycle of the further WD 22, wherein the resource is determined based on a mapping rule. The time gap and the mapping rule are as described in the preceding set of embodiments.

In an embodiment, the dedicated resource is contained within a PSFCH occasion.

In another embodiment, a WD 22 transmits a single SL WUS to wake up multiple further WDs 22. For example, when the WD 22 is a transmitter WD 22 in a SL groupcast communication and the WD 22 wants to wake up multiple receiver WDs 22 in the group at the same time.

In another embodiment, a WD 22 transmits multiple SL WUS, each to wake up a single further WD 22. For example, when the WD 22 is participating in multiple unicast with multiple further WDs 22, respectively. Another example is when the WD 22 is a transmitter WD 22 in a SL groupcast communication, and the WD 22 wants to wake up each receiver WD 22 individually. For example, before a retransmission of a packet, the WD 22 wants to wake up only those receiver WDs 22 who sent a NACK feedback for an earlier transmission of the packet.

Other Example Aspects and Embodiments of the SL WUS

In the way it is defined, the same SL WUS may be used by multiple transmitters. For example, WD1 22 may be interested in waking up WD2 22. At the same time and without being aware of WD1's 22 intentions, WD3 22 may be interested in waking up WD2 as well. Since both WD1 22 and WD3 22 transmit the same signal, WD2 22 will receive the superposition of the transmissions from WD1 22 and WD3 33 and the received signal combination may be correctly interpreted as a WUS.

Some Example Embodiments for SL GTS

Several embodiments are described in term of GTS for simplicity; however, it should be understood that such embodiments may also be applicable to the WUS (just replace WUS by GTS).

Some Embodiments Related to the Physical Format of the SL GTS

In an embodiment, a SL GTS may be defined as a sequence transmitted in a set of contiguous subcarriers or resource blocks in a number of contiguous OFDM symbols.

In an embodiment, a SL GTS may be defined by reusing the physical format of the NR Rel-16 PSFCH (i.e., a cyclically-shifted version of a low-PAPR base sequence sent in a resource block) and is transmitted in a PSFCH occasion.

In sub embodiment, the SL GTS conveys a pseudo NACK feedback. In another sub embodiment, the SL GTS conveys a pseudo ACK feedback.

In one embodiment, the SL GTS is transmitted on a dedicated resource that is separately configured from the PSFCH resources. For example, the SL GTS may be transmitted in the same slot and symbol as PSFCH but it may be separated in frequency or code domain (e.g., using a different cyclic shift).

Some Example Embodiments Related to Behaviors of the WD 22 Receiving (i.e., Targeted by) a SL GTS In an embodiment, a WD 22 with SL DRX enabled is configured to search for a SL GTS in a dedicated resource (e.g., dedicated symbol/slot and/or RB and/or CS) during the DRX ON duration of a DRX cycle of the WD 22, the resource is determined based on a mapping rule.

In an embodiment, a WD 22 with SL DRX enabled is configured to search for a SL GTS in a PSFCH occasion during the DRX ON duration of a DRX cycle of the WD 22, wherein the GTS resource within the PSFCH occasion is determined based on a mapping rule.

Furthermore, if the SL GTS is detected, the WD 22 switches to sleep mode.

In an embodiment, the WD 22 searches for a SL GTS in every PSFCH occasion during the WD's 22 DRX ON duration except the PSFCH occasions in which the WD 22 expects a PSFCH carrying HARQ feedback for an earlier PSCCH/PSSCH transmission from the WD 22.

Figure 15:
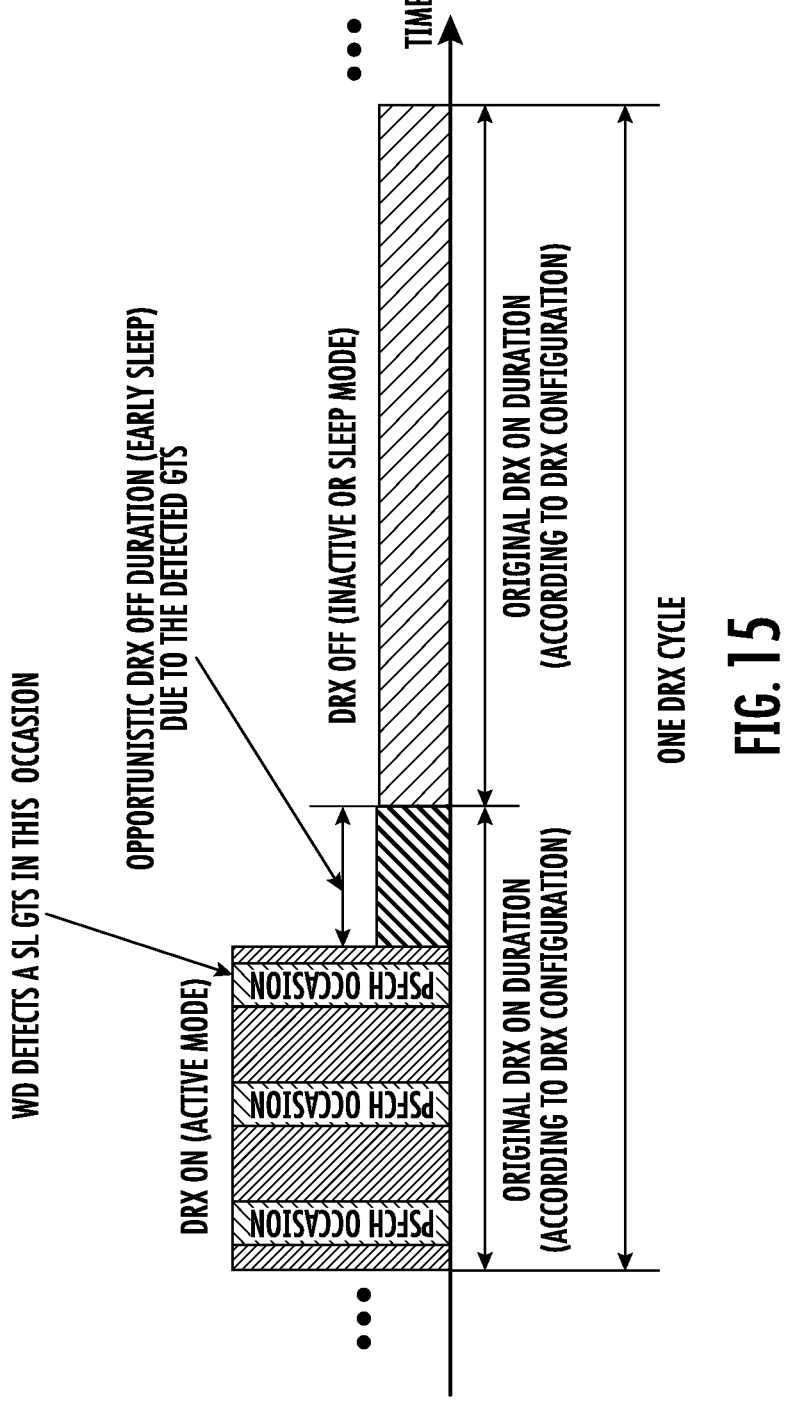
FIG. 15 illustrates an example of SL GTS according to some embodiments of the present disclosure.

FIG. 15 illustrates an example of GTS. After detecting a GTS, the WD 22 switches to DRX OFF (sleep mode) earlier than originally configured by the DRX configuration.

The WD 22 searches for GTS in all PSFCH occasions during its DRX ON except the PSFCH occasions in which it expects a PSFCH carrying HARQ feedback for an earlier PSSCH transmission.

In an embodiment of the mapping rule, the GTS resource is determined based at least on one of: an ID of the WD 22, a group ID of a group that the WD 22 belongs to, an ID of the WD 22 sending the GTS.

In an embodiment of the mapping rule, the GTS resource is determined by following the procedure for determining a PSFCH resource of SL 3GPP Rel-16 with the following changes:

The parameter Layer-1 ID of the Tx WD is replaced by the Layer-1 ID of the WD 22.

The parameter member ID of the Rx WD for groupcast feedback option 2 (which is set to 0 for unicast and groupcast option 1) is replaced by the Layer-1 ID of a further WD 22 with whom the WD 22 is communicating or set to 0.

The parameters subchannel index and slot index of the associated PSSCH is replaced by some pre-defined values. For example, the subchannel index and slot index corresponding to the first subchannel in the first PSSCH slot associated with the PSFCH occasion.

Additionally, the CS in a pair of CS is determined based on whether the SL GTS is a pseudo ACK or a pseudo NACK.

In a more concrete embodiment of the mapping rule, the GTS resource may be determined by following the WD 22 procedure for reporting HARQ-ACK on sidelink in NR 3GPP Rel-16 (Section 16.3, TS 38.213 V16.3.0) with the following input parameters:

In some embodiments, slot i and subchannel j may be fixed. For example, i=0 and j=0, corresponding to the first subchannel in the first PSSCH slot associated with the PSFCH occasion.

In some embodiments, slot i and subchannel j may be obtained from a slot index and subchannel index of a previous PSSCH received by the WD 22.

In some embodiments, $P_{ID}$ may be the physical layer ID of the WD 22. For example, this can be used when the WD 22 is participating in a unicast SL communication with a further WD 22. This option of $P_{ID}$ can also be used when the WD 22 is participating in a groupcast SL communication.

In some embodiments, $P_{ID}$ may be the physical layer destination group ID associated with a group of WDs 22 to which the WD 22 belongs. For example, when the WD 22 is participating in a groupcast SL communication with which a physical layer destination group ID is associated.

In some embodiments, $M_{ID}$ equals the Layer-1 ID of a further WD 22 with whom the WD 22 is communicating.

In some embodiments, $M_{ID}$ equals 0.

In some embodiments, $m_{cs}$=0, i.e., the GTS resembles a PSFCH carrying a NACK. In some other embodiments, $m_{cs}$=6, i.e., the GTS resembles a PSFCH carrying an ACK.

In an embodiment, the WD 22 searches for multiple GTS in the same slot or the same set of OFDM symbols. For example, if the WD 22 is participating in multiple SL unicast and/or groupcast sessions with other WDs 22. In one example, the WD 22 switches to sleep mode if a certain number of GTS is detected. In another example, the WD 22 switches to sleep mode only if it receives GTS from certain high-priority further WD 22. In some examples, the priority can be based on the priority of the messages coming from the further WD 22 in the past or on the nature of the communication with the further WD 22 (e.g., unicast or groupcast or broadcast).

Some Example Embodiments Related to Behavior of WD 22 Transmitting the SL GTS In one embodiment, a WD 22 transmits a SL GTS in a dedicated resource to a further WD 22 to indicate the WD 22 has no more data to transmit to the further WD 22 in the current DRX cycle, wherein the resource is determined based on a mapping rule as described in the preceding set of embodiments.

In an embodiment, the dedicated resource is contained within a PSFCH occasion.

In another embodiment, a WD 22 transmits a single SL GTS to multiple further WDs 22. For example, when the WD 22 is a transmitter WD 22 in a SL groupcast and the WD 22 wants to tell multiple receiver WDs 22 in the group to switch to sleep mode early.

In another embodiment, a WD 22 transmits multiple SL GTS, each targets a single further WD 22. For example, when the WD 22 is participating in multiple unicast with multiple further WDs 22, respectively. Another example is when the WD 22 is a transmitter WD 22 in a SL groupcast communication, and the WD 22 wants to indicate to each receiver WD 22 individually. For example, the WD 22 wants to tell those receiver WDs 22 who sent ACK feedbacks for a packet to switch to sleep mode early.

Some Embodiments May Include One or More of the Following:

Embodiment A1. A wireless device configured to communicate with another wireless device, the wireless device configured to, and/or comprising a radio interface and/or comprising processing circuitry configured to:

receive one of a wake-up-signal (WUS) and a go-to-sleep signal (GTS) for sidelink (SL) on at least one resource within a set of dedicated resources during a physical sidelink feedback channel (PSFCH) occasion.

Embodiment A2. The wireless device of Embodiment A1, wherein one or more of:

the set of dedicated resources for the one of the WUS and the GTS are orthogonal to the PSFCH resources;

the set of dedicated resources for the one of the WUS and the GTS overlaps with the PSFCH resources;

the one of the WUS and the GTS including a sequence; and/or the set of dedicated resources being compatible with the physical sidelink feedback channel (PSFCH).

Embodiment B1. A method implemented in a wireless device, the method comprising:

receiving one of a wake-up-signal (WUS) and a go-to-sleep signal (GTS) for sidelink (SL) on at least one resource within a set of dedicated resources during a physical sidelink feedback channel (PSFCH) occasion.

Embodiment B2. The method of Embodiment B1, wherein one or more of:

the set of dedicated resources for the one of the WUS and the GTS are orthogonal to the PSFCH resources;

the set of dedicated resources for the one of the WUS and the GTS overlaps with the PSFCH resources;

the one of the WUS and the GTS including a sequence; and/or the set of dedicated resources being compatible with the physical sidelink feedback channel (PSFCH).

Embodiment C1. A wireless device (WD) configured to communicate with another wireless device, the wireless device configured to, and/or comprising a radio interface and/or comprising processing circuitry configured:

transmit one of a wake-up-signal (WUS) and a go-to-sleep signal (GTS) for sidelink (SL) on at least one resource within a set of dedicated resources during a physical sidelink feedback channel (PSFCH) occasion.

Embodiment C2. The WD of Embodiment C1, wherein one or more of:

the set of dedicated resources for the one of the WUS and the GTS are orthogonal to the PSFCH resources;

the set of dedicated resources for the one of the WUS and the GTS overlaps with the PSFCH resources;

the one of the WUS and the GTS including a sequence; and/or the set of dedicated resources being compatible with the physical sidelink feedback channel (PSFCH).

Embodiment D1. A method implemented in a wireless device (WD), the method comprising:

transmitting one of a wake-up-signal (WUS) and a go-to-sleep signal (GTS) for sidelink (SL) on at least one resource within a set of dedicated resources during a physical sidelink feedback channel (PSFCH) occasion.

Embodiment D2. The method of Embodiment D1, wherein one or more of:

the set of dedicated resources for the one of the WUS and the GTS are orthogonal to the PSFCH resources;

the set of dedicated resources for the one of the WUS and the GTS overlaps with the PSFCH resources;

the one of the WUS and the GTS including a sequence; and/or the set of dedicated resources being compatible with the physical sidelink feedback channel (PSFCH).

Some embodiments of the proposed solution may include an opportunistic use of the existing PSFCH framework for the transmission and reception of SL WUS and SL GTS. One or more of the rules to define the resources where the WUS/GTS is sent are described in the present disclosure.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that May be Used in the Preceding Description Include:

Abbreviation Explanation

3GPP $3^{rd}$ Generation Partnership Program

BS Base Station

CBR Channel busy ratio

D2D Device-to-device

DL Downlink

DRX Discontinuous Reception gNB gNode B

GTS Go-to-sleep

LTE Long Term Evolution

NCIS Network Controlled Interactive Services

NR New Radio

NSPS National Security and Public Safety

NW Network

Out of Coverage

PDCCH Physical Downlink Control Channel

PHY Physical (layer)

PRACH Physical random access channel

PUCCH Physical uplink control channel

ProSe Proximity Services

PSCCH Physical Sidelink Control Channel

PSSCH Physical Sidelink Shared Channel

QoS Quality of service

RACH Random Access Channel

33

RRC Radio Resource Control
RX Receive
SR Scheduling request
SA Scheduling assignment
SCI Sidelink Control Information
SL Sidelink
SLRB Sidelink Radio Bearer
TX Transmit
UC Use Case
UE User Equipment
UL Uplink
V2V Vehicle-to-vehicle
V2X Vehicle-to-anything
WUS Wake-up signal
WUC Wake-up channel It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a wireless device, WD, operating in a sidelink, SL, discontinuous reception, DRX, the method comprising:
  monitoring a power saving signal for the SL DRX on at least one resource within a set of dedicated resources at a physical sidelink feedback channel, PSFCH, occasion, the power saving signal being a wake-up-signal, WUS, and the PSFCH occasion at a first PSFCH occasion occurring at or before a time period, T, before a start of a DRX ON duration of a DRX cycle; and
  as a result of detecting the WUS at the PSFCH occasion, switching between a DRX Inactive state and a DRX Active state.

2. The method of claim 1, wherein the method further comprises receiving, from a network node, a configuration to monitor the WUS at the first PSFCH occasion occurring at or before the time period, T, before the start of the DRX ON duration.

3. The method of claim 1, wherein the method further comprises receiving, from a second WD, a configuration to monitor the WUS at the first PSFCH occasion occurring at or before the time period, T, before the start of the DRX ON duration.

4. The method of claim 1, further comprising determining whether to switch between the DRX Inactive state and the DRX Active state based at least in part on a priority associated with a further WD that sends the WUS.

5. A method implemented in a wireless device, WD, operating in a sidelink, SL, discontinuous reception, DRX, the method comprising:
  transmitting, to a further WD, a power saving signal for the SL DRX on at least one resource within a set of dedicated resources at a physical sidelink feedback channel, PSFCH, occasion, the power saving signal being a wake-up-signal, WUS, and the PSFCH occasion at a first PSFCH occasion occurring at or before a time period, T, before a start of a DRX ON duration of a DRX cycle, the WUS indicating to the further WD to switch between a DRX Inactive state and a DRX Active state.

6. The method of claim 5, wherein the method further comprises receiving, from a network node, a configuration to transmit the WUS at the first PSFCH occasion occurring at or before the time period, T, before the start of the DRX ON duration; or
  receiving, from a second WD, a configuration to transmit the WUS at the first PSFCH occasion occurring at or before the time period, T, before the start of the DRX ON duration.

7. A wireless device, WD, comprising processing circuitry, the processing circuitry configured to cause the WD to monitor a power saving signal for a sidelink, SL, discontinuous reception, DRX, on at least one resource within a set of dedicated resources at a physical sidelink feedback channel, PSFCH, occasion, the power saving signal being a wake-up-signal, WUS, and the PSFCH occasion at a first PSFCH occasion occurring at or before a time period, T, before a start of a DRX ON duration of a DRX cycle; and
  as a result of detecting the WUS at the PSFCH occasion, switching between a DRX Inactive state and a DRX Active state.

8. A wireless device, WD, comprising processing circuitry, the processing circuitry configured to cause the WD to transmit, to a further WD, a power saving signal for a sidelink, SL, discontinuous reception, DRX, on at least one resource within a set of dedicated resources at a physical sidelink feedback channel, PSFCH, occasion, the power saving signal being a wake-up-signal, WUS, and the PSFCH occasion at a first PSFCH occasion occurring at or before a time period, T, before a start of a DRX ON duration of a DRX cycle, the WUS indicating to the further WD to switch between a DRX Inactive state and a DRX Active state.

* * * * *